(12) United States Patent
Yogeswaren et al.

(10) Patent No.: US 11,674,377 B2
(45) Date of Patent: Jun. 13, 2023

(54) CONTACT OR PROXIMITY PAD MOUNTED SENSOR SYSTEM FOR IMAGING CAVITY DEFECTS AND DELAMINATION DEFECTS BETWEEN LAYERS IN MULTILAYERED CYLINDRICAL STRUCTURES IN SUBSURFACE WELLS

(71) Applicants: Elan Yogeswaren, Houston, TX (US); Sandip Maity, Manama (BH); Roger Steinsiek, Pearland, TX (US)

(72) Inventors: Elan Yogeswaren, Houston, TX (US); Sandip Maity, Manama (BH); Roger Steinsiek, Pearland, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 25 days.

(21) Appl. No.: 17/236,438

(22) Filed: Apr. 21, 2021

(65) Prior Publication Data
US 2021/0324729 A1    Oct. 21, 2021

Related U.S. Application Data

(60) Provisional application No. 63/013,068, filed on Apr. 21, 2020.

(51) Int. Cl.
*G01N 29/06* (2006.01)
*G01N 29/22* (2006.01)
(Continued)

(52) U.S. Cl.
CPC ........ *E21B 47/005* (2020.05); *E21B 47/0025* (2020.05); *G01N 29/06* (2013.01);
(Continued)

(58) Field of Classification Search
CPC ... E21B 47/005; E21B 47/0025; G01N 29/06; G01N 29/11; G01N 29/14; G01N 29/225;
(Continued)

(56) References Cited

U.S. PATENT DOCUMENTS

| | | | | |
|---|---|---|---|---|
| 5,469,736 A | * | 11/1995 | Moake | E21B 47/085 |
| | | | | 73/152.58 |
| 8,553,494 B2 | * | 10/2013 | Barolak | G01N 29/07 |
| | | | | 181/105 |

(Continued)

FOREIGN PATENT DOCUMENTS

| | | |
|---|---|---|
| WO | 2009108889 A2 | 9/2009 |
| WO | 2016187242 A1 | 11/2016 |

(Continued)

OTHER PUBLICATIONS

International Search Report and Written Opinion for PCT/US2021/028378; Korean Intellectual Property Office; dated Jul. 26, 2021; 10 pages.

(Continued)

*Primary Examiner* — Jacques M Saint Surin
(74) *Attorney, Agent, or Firm* — Cantor Colburn LLP

(57) ABSTRACT

An apparatus for inspecting a well having nested multi-tubular structure, includes: an acoustic transducer conveyed in an inner-most tubular in the structure and configured to receive a return acoustic signal having a plurality of resonances due to the structure; an acoustic impedance matching material disposed on a sensing face of the acoustic transducer; a signal generator that generates a signal having a plurality of frequencies to drive the acoustic transducer; a signal shaper that modifies the signal to provide a drive signal to the acoustic transducer; and a processor configured to determine an annulus distance of any tubular in the structure with respect to an adjacent tubular using a time of flight of a transmitted acoustic signal, an acoustic speed in
(Continued)

a component in the nested multi-tubular structure using the annulus distance and the plurality of resonances, and a characteristic of the component that corresponds with the acoustic speed.

23 Claims, 19 Drawing Sheets

(51) Int. Cl.
  *E21B 47/002* (2012.01)
  *G01N 29/11* (2006.01)
  *G01N 29/14* (2006.01)
  *E21B 47/005* (2012.01)
(52) U.S. Cl.
  CPC .............. *G01N 29/11* (2013.01); *G01N 29/14* (2013.01); *G01N 29/225* (2013.01); *G01N 2291/015* (2013.01)
(58) Field of Classification Search
  CPC ...... G01N 29/437; G01N 29/28; G01N 29/32; G01N 29/323; G01N 29/326; G01N 29/348; G01N 29/46; G01N 29/50; G01N 29/12; G01N 2291/0232; G01N 2291/02854; G01N 2291/2636; G01N 2291/015
  USPC ....................................................... 73/152.58
  See application file for complete search history.

(56) References Cited

U.S. PATENT DOCUMENTS

| | | | |
|---|---|---|---|
| 8,917,094 B2* | 12/2014 | Bittar | ........................ G01V 3/26 324/345 |
| 10,138,727 B2* | 11/2018 | Zeroug | ................. E21B 49/003 |
| 10,767,460 B2* | 9/2020 | Mohs | ..................... E21B 43/25 |
| 2008/0314586 A1 | 12/2008 | Freeman | |
| 2014/0056101 A1 | 2/2014 | Vu et al. | |
| 2015/0218930 A1 | 8/2015 | Zeroug et al. | |
| 2019/0055830 A1 | 2/2019 | Skataric et al. | |
| 2019/0112912 A1 | 4/2019 | Thompson et al. | |
| 2020/0088023 A1 | 3/2020 | Gooneratne et al. | |
| 2020/0109626 A1 | 4/2020 | Hu et al. | |

FOREIGN PATENT DOCUMENTS

| | | | | |
|---|---|---|---|---|
| WO | 2018064170 A1 | 4/2018 | | |
| WO | WO-2019236832 A1 * | 12/2019 | ......... | E21B 47/0025 |

OTHER PUBLICATIONS

Zeroug et al.; "Sonic and Ultrasonic Measurement Applications for Cased Oil Wells"; Schlumberger-Doll Research Center; 19th World Conference on Non-Destructive Testing Jun. 13-17, 2016; 12 pages.

* cited by examiner

High frequency (2.5MHz) simulation for simultaneous A annulus fluid acoustic impedance and casing caliper.

Low frequency (605kHz) measurement for A annulus casing caliper.

Echo arrival time for tubing eccentered in casing, Annulus-A = 75mm

605 kHz PbNb2O6 piezo disc with 10 MRayl Backing, Combined Pad-Face + Tubing thickness = 0.5λ (4.9mm) thick steel

CONTACT OR PROXIMITY PAD MOUNTED SENSOR SYSTEM FOR IMAGING CAVITY DEFECTS AND DELAMINATION DEFECTS BETWEEN LAYERS IN MULTILAYERED CYLINDRICAL STRUCTURES IN SUBSURFACE WELLS

CROSS REFERENCE TO RELATED APPLICATIONS

This application is a non-provisional of U.S. Application Ser. No. 63/013,068 filed Apr. 21, 2020, the disclosure of which is incorporated by reference herein in its entirety.

BACKGROUND

This disclosure relates generally to oilfield equipment for evaluating well integrity in cemented oil and gas wells with multiple concentric casing and tubing elements and more particularly to downhole logging systems and methods for generation and detection of acoustic waves to determine dimensions and images of cavities and delaminations in annular spaces containing cements.

Oil and gas wells are typically constructed of casings and tubulars ideally in concentric multilayered cylindrical configurations with annular spaces in-between that are filled with fluids including completion, drilling and or production fluids such as gas, oil, or brine as well as bonding agents that are typically oilfield cements. The integrity of these wells against production fluid leakages via the annular spaces need to be ensured at commencement of production and at end of life abandonment of well.

In hydrocarbon-producing wells such as oil and gas wells, it is important to ensure that there is no oil or gas leakage from the well into the surrounding rock formation. This is a requirement for the hydrocarbon-producing wells. The obvious consequences are blowouts or leaks that can cause material damage, loss of production and environmental damages, resulting in costly and risky repairs. To ensure proper well operation, the well casing is surrounded by a cement wall as a part of construction of the hydrocarbon-producing well. There are different defects that can occur during the construction process of the well leading to well integrity issues. But once the hydrocarbon-producing well has been commissioned after clearance of any defects occurring during the construction process, the well integrity requires to be monitored, as new defects like micro-annuli and cement de-bonding start occurring during an operational life of the hydrocarbon-producing well. And the presence of the micro-annulus, as well as cement de-bonding creates a risk of leakage of oil and gas from the well bore into the rock formation.

Some of the reasons for formation of micro-annulus for example include, the thermal expansion of cement during the initial process of wall formation, that expands the steel casing, and subsequent cooling and contraction of cement during the setting process which creates annulus or micro-annulus at the steel-cement interface. Sometimes, during drilling, the hydrostatic pressure in casing reduces, leading to contraction of the casing. This can result in creation of annulus in the casing cement interface. The outer surface of casing may be covered by an oil film or a corrosion inhibitor which may not allow proper bonding with cement and annulus may be formed due to improper bonding. Moreover, cyclic pressure and temperature variations during hydrocarbon production also lead to the de-bonding of cement from the casing.

It is useful to detect the presence of micro-annulus and know the extent of cement de-bonding to take timely preventive actions. Some of the techniques to detect the micro-annulus and cement de-bonding in oil and gas wells include use of acoustic waves in the ultrasound region that travel through the well bore and casing-cement interfaces and are reflected back. The reflected waves are studied for their attenuation, amplitude, impedance, time of flight to determine the presence of annulus and the extent of penetration of the annulus into the cement wall. The limitation of the ultrasound-based technique being used is that, the oil and other well fluids, and cement signatures for attenuation are similar, and therefore it is difficult to accurately determine the presence of micro-annulus, or the extent of damage. Also, ultrasound wave of a particular frequency may not be able to pass through all the layers, thereby limiting its use when multiple layers are present between the transmitter and receiver. Further some of these techniques employ complex statistical signal processing, making it a complex procedure. In addition, traditional methods are not effective as not enough energy is transmitted out to the cement in the annuli or returned to the receivers to give a measurable effect in the system to identify cement cavities and delaminations. This measurement degenerates further with eccentricities of casings and tubulars from a perfectly concentric geometry.

BRIEF SUMMARY

Disclosed is an apparatus for inspecting a well having nested multi-tubular structure. The apparatus includes: an acoustic transducer coupled to a mandrel configured to be conveyed in an inner-most tubular in the nested multi-tubular structure, the acoustic transducer configured to transmit an acoustic signal and receive a return acoustic signal having a plurality of resonances due to the multi-tubular structure; an acoustic impedance matching material disposed on a sensing face of the acoustic transducer; a signal generator that generates a signal having a plurality of frequencies to drive the acoustic transducer; a signal shaper that modifies the signal by applying at least one of amplitude modulation and frequency modulation to provide a drive signal to the acoustic transducer; and a processor configured to (i) determine an annulus distance of any tubular in the nested multi-tubular structure with respect to an adjacent tubular using a time of flight of the transmitted acoustic signal, (ii) determine an acoustic speed in a component in the nested multi-tubular structure using the annulus distance and the plurality of resonances, and (iii) determine a characteristic of the component that corresponds with the acoustic speed.

Also disclosed is a method for inspecting a well having a nested multi-tubular structure. The method includes: generating a signal pulse having a plurality of frequencies using a signal generator; modifying the signal pulse by applying at least one of amplitude modulation and frequency modulation using a signal shaper to provide a drive signal; transmitting an acoustic signal based on the drive signal into an inner-most tubular of the nested multi-tubular structure using an acoustic transducer coupled to a mandrel configured to be conveyed in the inner-most tubular, the acoustic transducer being configured to transmit the acoustic signal and receive a return acoustic signal having a plurality of resonances due to the nested multi-tubular structure; transitioning an acoustic impedance between the acoustic transducer and the inner-most tubular using an acoustic transition impedance matching material disposed on a sensing face of the acoustic transducer; receiving the return acoustic signal having a plurality of resonances due to the nested multi-tubular structure; determining an annulus distance of any tubular in the nested multi-tubular structure with respect to an adjacent tubular using a time of flight of the transmitted acoustic signal; determining an acoustic speed in a component in the nested multi-tubular structure using the annulus distance and the plurality of resonances; and determining a characteristic of the component that corresponds with the acoustic speed.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Detection of cement de-bonding or occurrence of micro-annuli in one or more of well integrity layers, which include casing, cement, and the interface layers of casing-cement, and casing-bedrock is important for determining well integrity in oil and gas wells, as mentioned herein above. The apparatus and method for determining well integrity of a hydrocarbon-producing well described herein uses uniquely, the resonances reflected from the well integrity layers to determine well integrity features and in some embodiments a geometry characterization image of the different well integrity layers. Well integrity features include but are not limited to a presence or absence of micro-annuli, length and thickness of micro-annulus and cement de-bonding. Microannulus referred herein implies generally an annulus of about 1.5 mm or less. It would be appreciated by those skilled in the art that the dimensions of annulus to be detected can be varied based on user requirement.

The reflected resonances described herein are acoustic resonances, where a frequency of resonance matches one of the natural frequencies that are transmitted through the well integrity layers. The well integrity layers may include oil or gas or water or air, or different combination of these, besides a material of the well integrity layer, such as steel or cement or rock, and these are referred generally as a "medium" for transmission and reflection purpose.

Aspects of the invention use the principle that when sound wave of a particular frequency is incident on a cavity, it bounces back and forth between the cavity walls. If the frequency of the sound wave is such that an integral number of wavelengths fit in the round-trip distance, then the incident and reflected waves constructively interfere, causing resonances. Therefore, the resonance criterion is:

$$2d = n\lambda \quad \text{Equation 1}$$

Here d is the cavity length, n is an integer and X is the wavelength of the sound wave. If the speed of the sound wave in the medium is c, then the frequency of the sound wave $f = c/\lambda$. Therefore, $$f_n = nc/2d \quad \text{Equation 2}$$

$$\Delta f = f_{(n+1)} - f_n = c/2d \quad \text{Equation 3}$$

This means that the spacing between two consecutive resonances depends only on the speed of sound in that medium and the length of the medium. If the length of the medium is known, the speed of sound in the medium can be determined by finding the frequency spacing between the resonances. From this, the medium may be identified.

Different embodiments of the invention based on the above principle are described herein below in more detail in reference to the drawings.

Figure 1:
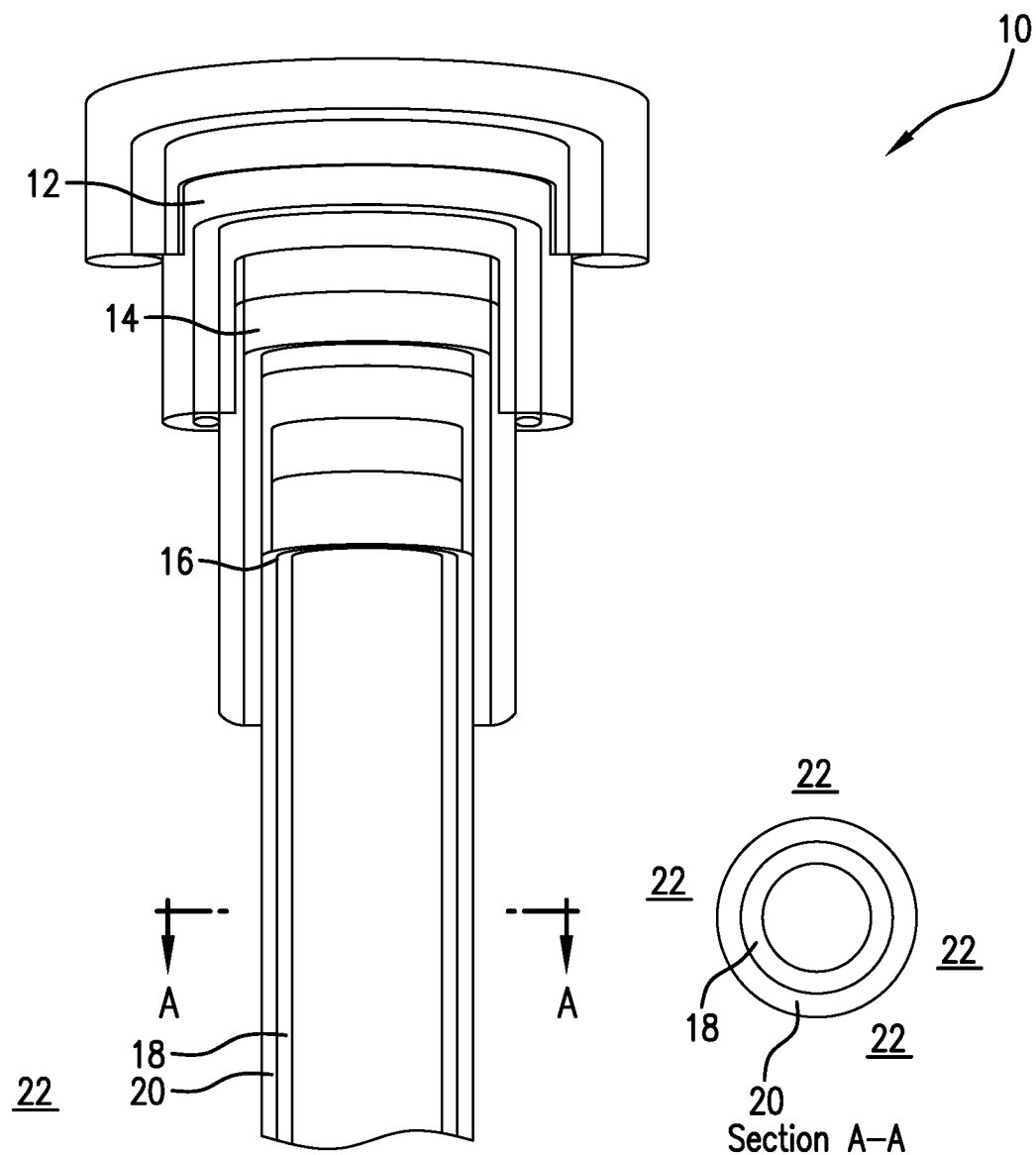
FIG. 1 is a diagrammatic representation of a well bore where the apparatus and method of the invention are deployed.

FIG. 1 is a diagrammatic representation of a well bore part of hydrocarbon-producing well 10 showing a series of cylindrical casings 12, 14, 16. As is seen in FIG. 1, as the depth increases, the number of layers around the casings reduce, and at depths of about 1000-3000 meters, the number of layers around the casing is one or two. Casing 18, for example has only a cement wall 20 surrounding an outer surface of the casing, and bedrock 22 beyond the cement wall. In one example, the well bore hole may have dimensions of about 80-360 mm, and may be filled with oil, gas, water, or brine and have a temperature up to 180 degrees and a pressure of 15000-20000 psi. The steel casing 18 may be 8-36 mm thick and have a carbon content of 0.1-0.5%, and the cement wall may have a thickness of 25-55 mm. The apparatus and method of the invention are used at the increased depths of 1000-3000 meters.

Figure 2:
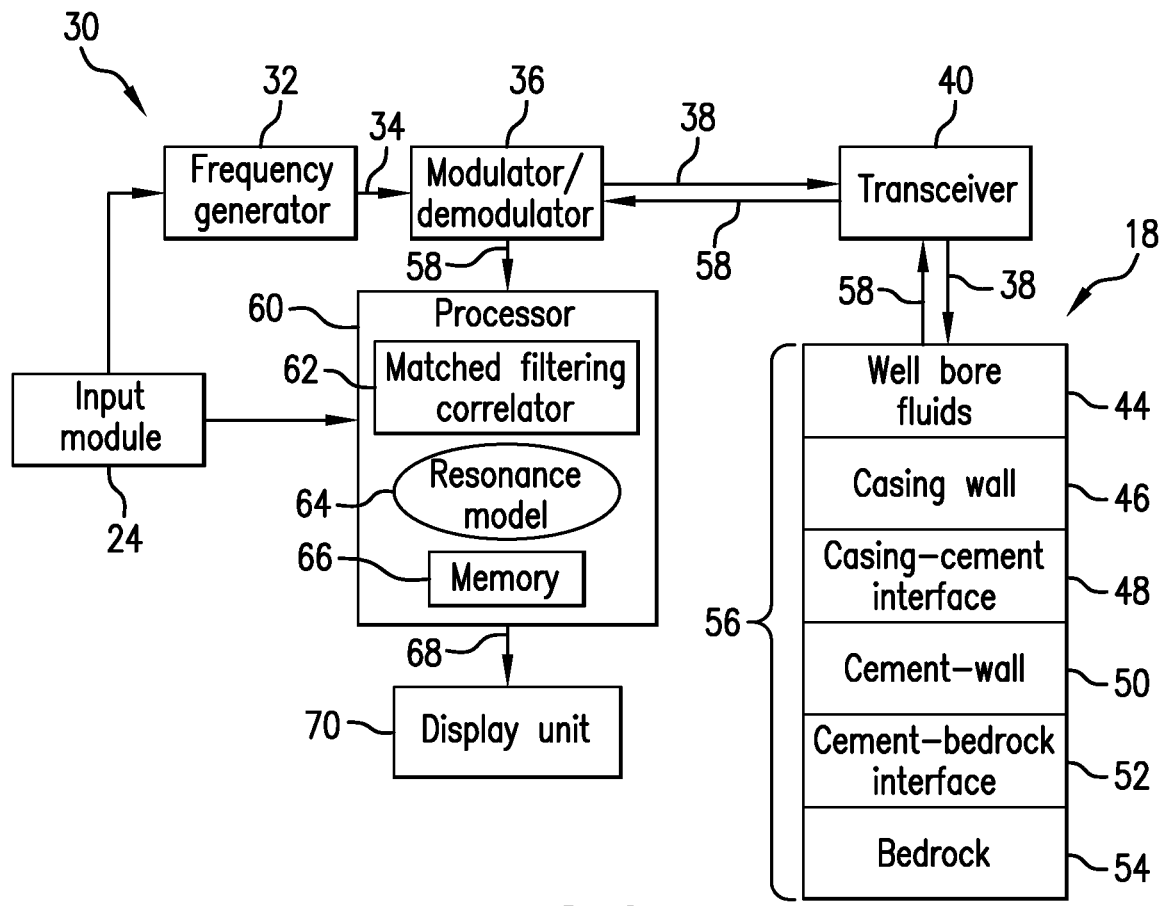
FIG. 2 is a block diagram representation of an exemplary embodiment as an apparatus for determining the well integrity according to one aspect of the invention.

FIG. 2 is a diagrammatic representation of an embodiment of an apparatus 30 for determining well integrity of a hydrocarbon-producing well. It would be appreciated by those skilled in the art, that the apparatus 30 is deployed at the given depth inside the casing 18 shown in FIG. 1, and therefore has material and structural integrity to withstand the high pressures and high temperatures at these depths.

In one exemplary embodiment, the apparatus 30 is a downhole apparatus, where "downhole" implies that the apparatus is deployed at a predetermined depth inside the well bore. In some other embodiments, part of apparatus 30 may be provided as a downhole tool, and a part may be provided as a surface module that is in communication with the downhole tool.

The apparatus 30 includes an input module 24 that is used to provide user defined or sensor-based inputs or pre-programmed inputs to select components/modules of the apparatus 30. The input module 24 includes codes and routines configured to receive the inputs and is implemented using a processor and a memory, as tangible non-transitory components.

The apparatus 30 includes an acoustic frequency generator 32 for generating multiple acoustic frequencies 34 using typically a bulk wave in a range of about 1-10 Mega Hertz (the input module 24 provides the instruction to the frequency generator 32 for the desired bulk wave generation). The acoustic frequency generator 32 in one embodiment is implemented using an oscillator and amplifier through known circuitry.

The apparatus 30 further includes a modulator/de-modulator 36 for selecting a set of acoustic frequencies 38 from multiple acoustic frequencies 34 and applying a transmission sequence to the set of acoustic frequencies. The modulator/de-modulator 36 may be referred to as a signal shaper in one or more embodiments. A transceiver 40 is used for transmitting the set of acoustic frequencies 38 in the selected transmission sequence through the well 10 with well bore fluids 44, and the surrounding well integrity layers—steel casing wall 46, interface of steel casing wall and cement wall 48, cement wall 50, interface of cement wall and bedrock 52, and bedrock 54.

It would be appreciated by those skilled in the art that different transmission sequences may be used, for example but not limited to, a sequence where the set of acoustic frequencies are transmitted one at a time by using for example a frequency modulated signal like a chirp signal. In another implementation, the set of acoustic frequencies are transmitted as a coded signal, which is a digital signal, in yet another example, a set of pre-selected frequencies are transmitted simultaneously. Non-limiting embodiments of the transmission sequences include concurrently, coherently (e.g., having same phase) and/or sequentially.

The transceiver 40 also receives reflected resonances 58 corresponding to at least a subset of natural frequencies of the set of acoustic frequencies, that are reflected from different well integrity layers in a field of view of the set of transmission frequencies, shown generally by reference numeral 56. It would be appreciated by those skilled in the art that the field of view maybe different for different implementations, and may be dependent to some extent on a choice of a user (user may be an owner or a customer or a technical expert associated with the hydrocarbon-producing well), as well as on choice of transmission frequencies and transmission sequence.

It would be understood by those skilled in the art that once the set of acoustic frequencies penetrate the well bore, and the well integrity layers, the resonances that are affected are based on the physical properties of the layers that are encountered by these set of acoustic frequencies. For example, if a first frequency travels through a metal surface (i.e. casing wall), it will reflect a particular resonance, say a first resonance that will be a function of the first frequency. Similarly, if a second frequency travels through a micro-annulus (could be present in the casing cement interface, or in the cement wall, or in the cement-bedrock interface), it will reflect a different resonance, say a second resonance that will be a function of second frequency. Still further, if the micro-annulus is filled with a fluid (also sometimes referred to as 'medium', for example, oil or water), a third frequency will be reflected back as a third resonance, which will be a function of the third frequency, from the micro-annulus. Still further, if a fourth frequency travels through cement, a fourth resonance is reflected back, which is a function of the fourth frequency. Furthermore, the same resonance, for example, the first resonance, will be reflected multiple times depending on the continuity of the particular layer, in the case of first frequency has the metal layer, in its field of view. It may also be noted that there will be some frequencies that do not have any reflected resonances.

It would be appreciated by those skilled in the art, that by knowing what the possible materials of the well integrity layers are, the set of frequencies for transmission can be pre-determined. For example, the layers may include, steel in case of well casing, air in case of unfilled microannuli, fluid (oil or water) in case of filled or partially filled micro-annuli, cement, and bed-rock form other layers. Thus using this prior knowledge, frequencies that are known to have reflected resonances of particular characteristics for specific layers, can be pre-selected for transmission. This allows for very quick assessment of reflected resonances.

The transceiver 40 described herein above, in one exemplary embodiment is implemented by using a broadband piezoelectric crystal. Further, in one implementation an air coupled piezo electric crystal may be used as the transceiver 40, that will work for any medium or material, and in a different implementation a conventional couplant based piezoelectric crystal maybe used that works for oil and other fluid medium. In some embodiments, a phased array of piezoelectric crystals may be used. Piezoelectric crystal as a transceiver has several advantages, including ability to simultaneously transmit multiple frequencies. However, any other transducer, that is capable of transmitting multiple frequencies and receiving reflected resonances from the different layers, may be used. In some embodiments electromagnetic acoustic transducer (EMAT) may be used to remove a necessity of any couplant required for placing the transceiver 40 close to the casing wall. In case EMAT transducer is used, it may be used in an array format to enable transmission of multiple frequencies as a set of frequencies and for receiving reflected resonances from the different well integrity layers. In some embodiments an array of sensors is used as a transceiver to allow a three-reconstruction of an image of the different well integrity layers, described herein below.

Referring back to FIG. 2, a processor 60 is coupled to the transceiver 40 via the modulator-de-modulator 36 for processing the reflected resonances. The output of the processing yields a geometry characterization image of each of the layers and well integrity features based on the reflected resonances (this is processor output, and referred generally by reference numeral 68). In one implementation, the geometry characterization image received as processor output 68 is a three-dimensional image. The geometry characterization image includes thickness of each layer derived using the reflected resonances. The well integrity features include, but are not limited to, a presence or absence of micro-annuli, the location of the micro-annuli, and the extent of penetration of micro-annuli, as well as extent of cement de-bonding. These well integrity features are then used for any maintenance operation or any other control action for the oil and gas well.

The processor 60 referred herein above, may include filters to estimate resonant frequencies for example, a matched filtering correlator (for analog signals) 62 for detecting the reflected resonances. It would be appreciated by those skilled in the art that either analog or digital processing techniques will be employed based on the nature of transmitted signal. Further, the processing may include either time domain analysis or a frequency domain analysis.

In an exemplary implementation, the processor 60 includes a resonance model 64 comprising modelled resonances that is used for comparing the reflected resonances received from the transceiver 40 and for correcting for errors based on the modelled resonances. For selecting resonant peaks, based on the comparison, cepstrum analysis known in the art, may be used. In one example a correction factor is determined through the resonance model to correct for errors in the reflected resonances. Correction factor corrects errors present in the reflected resonances due to speed of sound variation with temperature and/or pressure at the depths where the transmission of the set of frequencies and the reflection of resonances occurs. Correction factor in some cases may also be provided to account for any material oxidation, or any operating parameter of the hydrocarbon-producing well, such as flow rate, fluid property such as oil/gas ratio, well pipe property like density, that impact the transmitted frequencies or reflected resonances. The well parameters referred herein above—temperature, pressure, material oxidation, operating parameters, and the like, are provided through the input module 24.

In one exemplary implementation, the modelled resonances are pre-defined resonances for different well integrity layers at different depths beyond 1000 meters. These modelled resonances are generated based on pre-selected frequencies of transmission and their respected known reflected resonances for different well integrity layers. The resonance model 64 in some implementations, also includes different modelled geometry characterization images of each layer based on modelled resonances and modelled physical characteristics of the respective well integrity layers. The resonance model, in some implementations will include a look-up table for storing (in a tangible memory in a computer implemented storage medium) the modelled resonances, modelled geometry characterization images, and modelled physical characteristics, and other such contents of the resonance model 64. The resonance model 64 may further include modelled well integrity characteristics that are derived from the modelled geometry characterization images in the resonance model.

The physical characteristics referred to herein above include but are not limited to, a smoothness factor of each layer, material properties of each layer, and the like. The modelled well integrity characteristics referred herein above include but are not limited to, a presence of microannulus, different dimensions of the micro-annulus, presence of cement de-bonding, extent of de-bonding and other related well-integrity characteristics.

The resonance model 64 described herein includes codes and routines configured for implementing the functionality of the resonance model and is implemented using a processor and a memory, as tangible non-transitory components.

The output 68 of the processor 60 may be communicated to an external or integrated display unit 70 for further control and maintenance actions. The display unit 70 may be implemented as a graphical user interface accessible for a user/operator or another communication device.

It would be understood by those skilled in the art that the different components of the apparatus 30 are in appropriate communication with each other, and the communication network, along with electrical and power network is provided for implementing the above functionalities of the different components of apparatus 30 shown in FIG. 2. Standard industry protocols may be used for implementing the connections between the different components of the apparatus 30.

Figure 3:
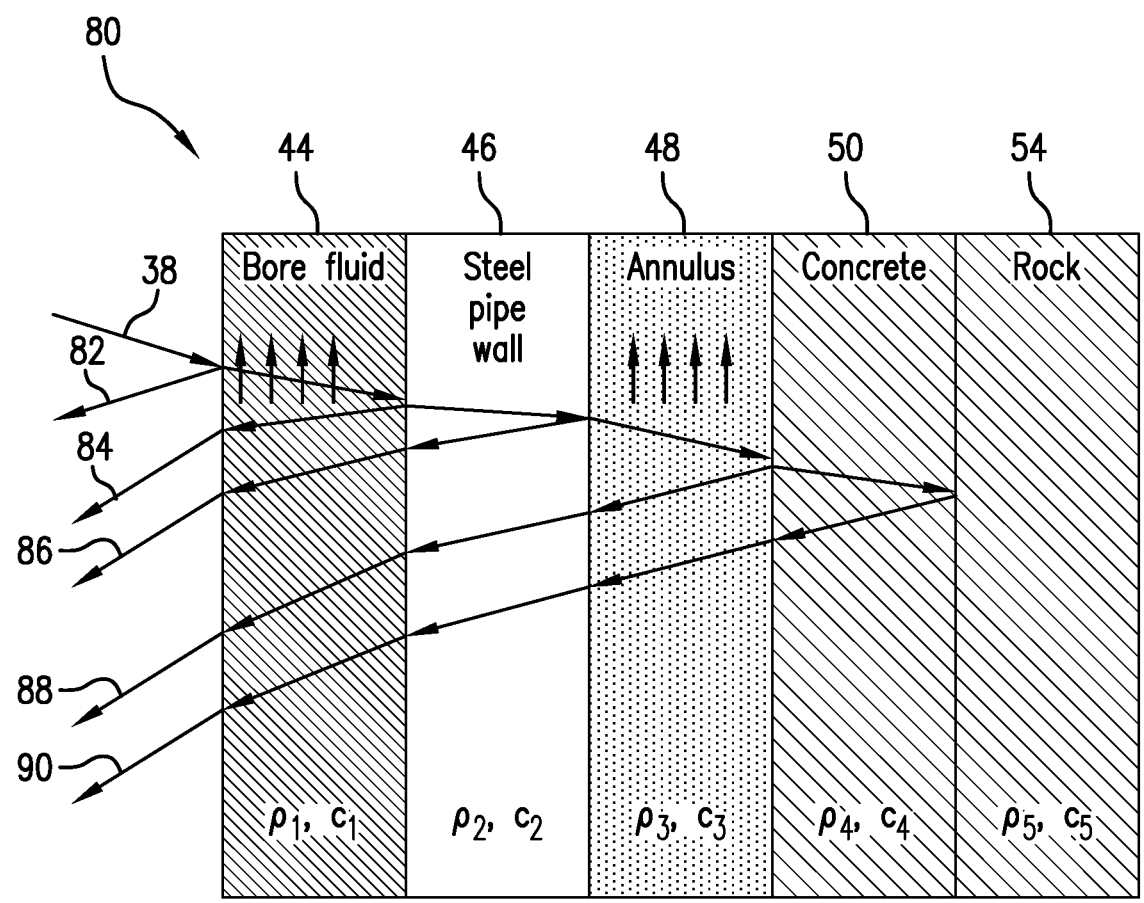
FIG. 3 is a diagrammatic representation of an exemplary wave propagation representation of the set of frequencies transmitted into the well bore and the reflected resonances from different well integrity layers.

FIG. 3 is a diagrammatic representation 80 to show the transmission of a set of frequencies 38 into different well integrity layers as referred herein above. As is shown in FIG. 3, arrows represented by reference numerals, 82-90 are representative resonance frequencies reflected from different material or medium of the well integrity layers such as well bore fluids such as oil or water 44, steel casing wall 46, air or water in annulus created in an interface 48 of steel casing wall and concrete (or cement) wall, concrete (or cement) wall 50, and bedrock 54. The densities of different layers and corresponding velocities of sound in that medium are shown as $\rho_{1\ (or\ n)}$, and $C_{1\ (or\ n)}$ in FIG. 3.

The processor 60 as described herein above in reference to FIG. 2, is used to determine a match between the representative frequencies in the set of frequencies 38 and their resonances 82-90 as shown in FIG. 3. Further analysis is done using known signal processing techniques such as match filtering, de-chirping, Hilbert Transform method, or other methods that are known in the art, to detect specific resonances. Once the filtered resonances are available, the distance between subsequent peaks for a given resonance is used to determine the thickness of each layer and to obtain other well integrity features as referred herein above.

Figure 4:
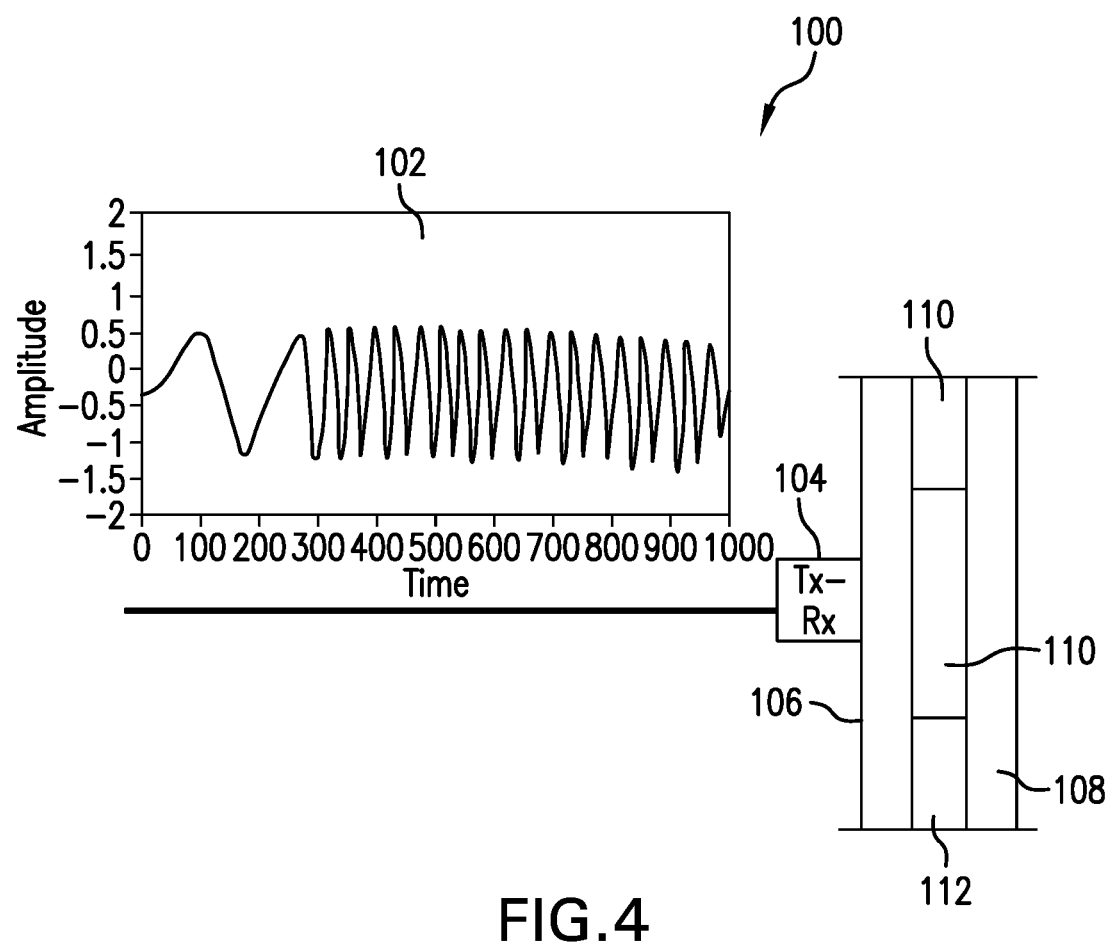
FIG. 4 is a diagrammatic representation of an experimental set-up to represent an implementation of the apparatus in representative well integrity layers.

FIG. 4 is a diagrammatic representation 100 of an experimental set-up for transmitting a set of frequencies represented by waveform 102 through a transceiver 104 into a steel layer 106, and 108, that has a pre-fabricated annulus 110 filled with water, created using a spacer material 112 disposed at two ends of the steel layer 106, as shown in FIG. 4. This experimental set-up emulates the steel casing with a water filled annulus in a hydrocarbon-producing well, and the well integrity layers are represented by the steel layers 106, and the water filled annulus 110 in this experimental set-up. FIG. 4 experimental setup shows that the transceiver 104 is in contact with the steel layer 106. However, it would be understood by those skilled in the art that the transceiver 104 may not be required to be in physical contact with the steel layer in some implementations in an actual hydrocarbon-producing, and as such both embodiments where the transceiver is in contact with the well casing and embodiments where the transceiver is not in contact with well casing is covered within the scope of the invention described herein.

Figure 5:
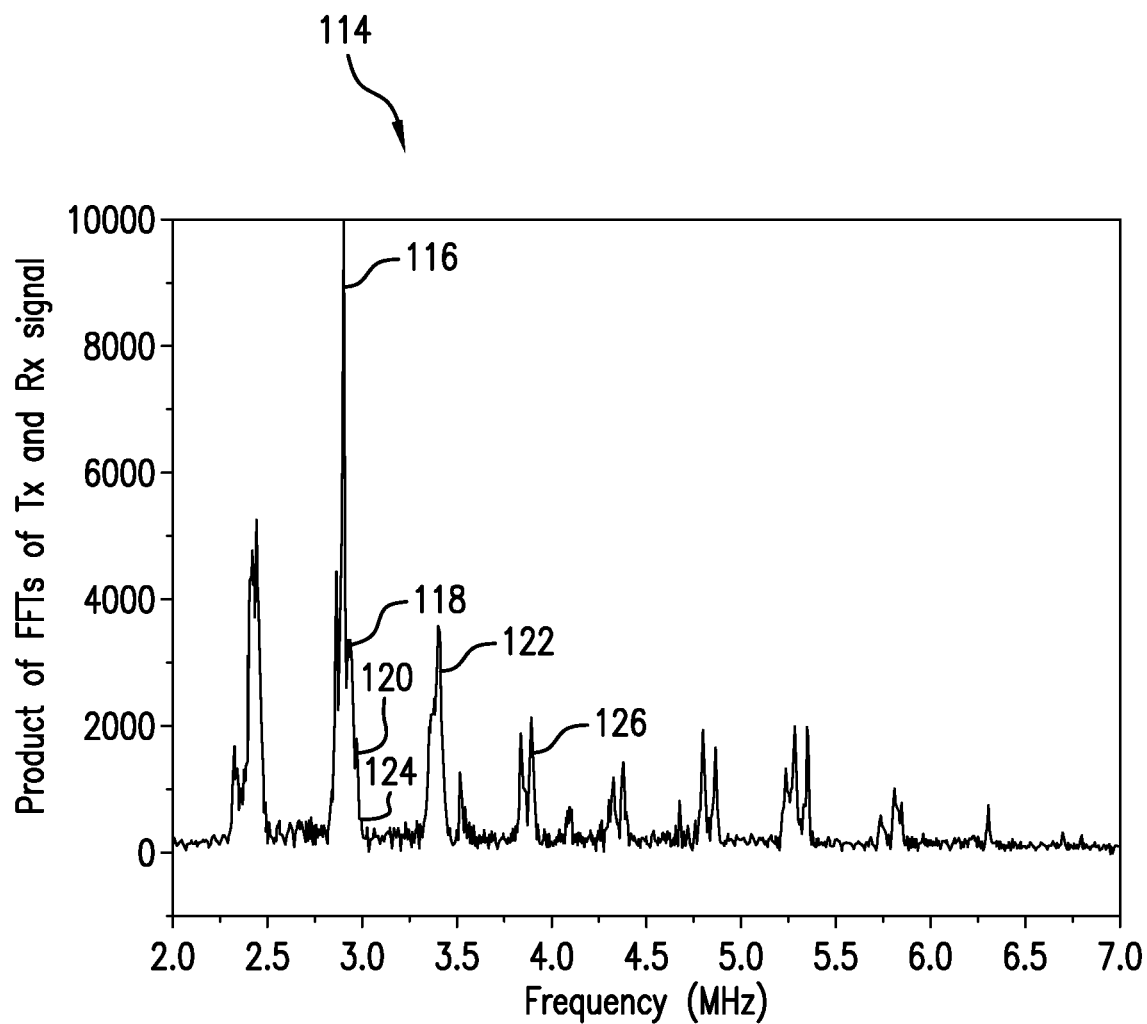
FIG. 5 is an illustrative representation of waveform of reflected resonances obtained in the experimental set-up of FIG. 4.

FIG. 5 illustrates a waveform representation 114 of reflected resonances received back from the steel layers 106 and 108 (in the experiment stainless steel blocks of thickness 5.87 mm were used), and water filled annulus 110 (in the experiment the annulus was created using a spacer of 1.14 mm thickness). As is seen in FIG. 5 the peaks of the waveform are representative of the layer (or medium or material) that is responsible for the reflected resonances. Few of the peaks have been marked for illustrative purpose as 116-126, however all the peaks are processed to determine parameters referred earlier as well integrity features, such as thickness of each layer, presence and extent of annulus, and detection of medium or material present in the annulus. The distance between two subsequent peaks of the resonances from the same layer, can be used to determine a thickness of that layer. Also, the peaks occurring at different heights are indicative of reflected resonances from different layers.

Figure 6:
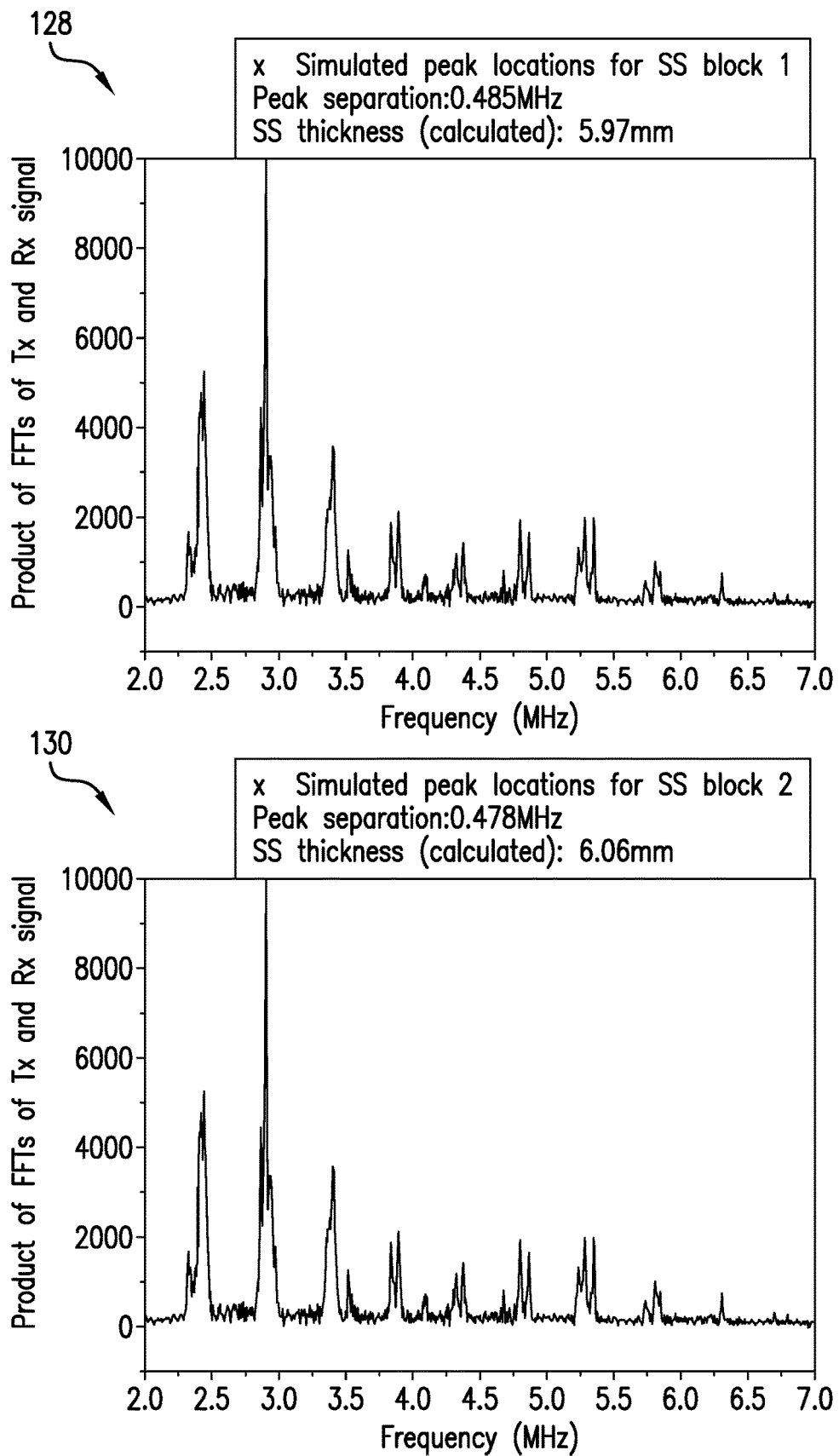
FIG. 6 is an illustrative representation of waveforms for steel layers in the experimental set-up of FIG. 4.
Figure 7:
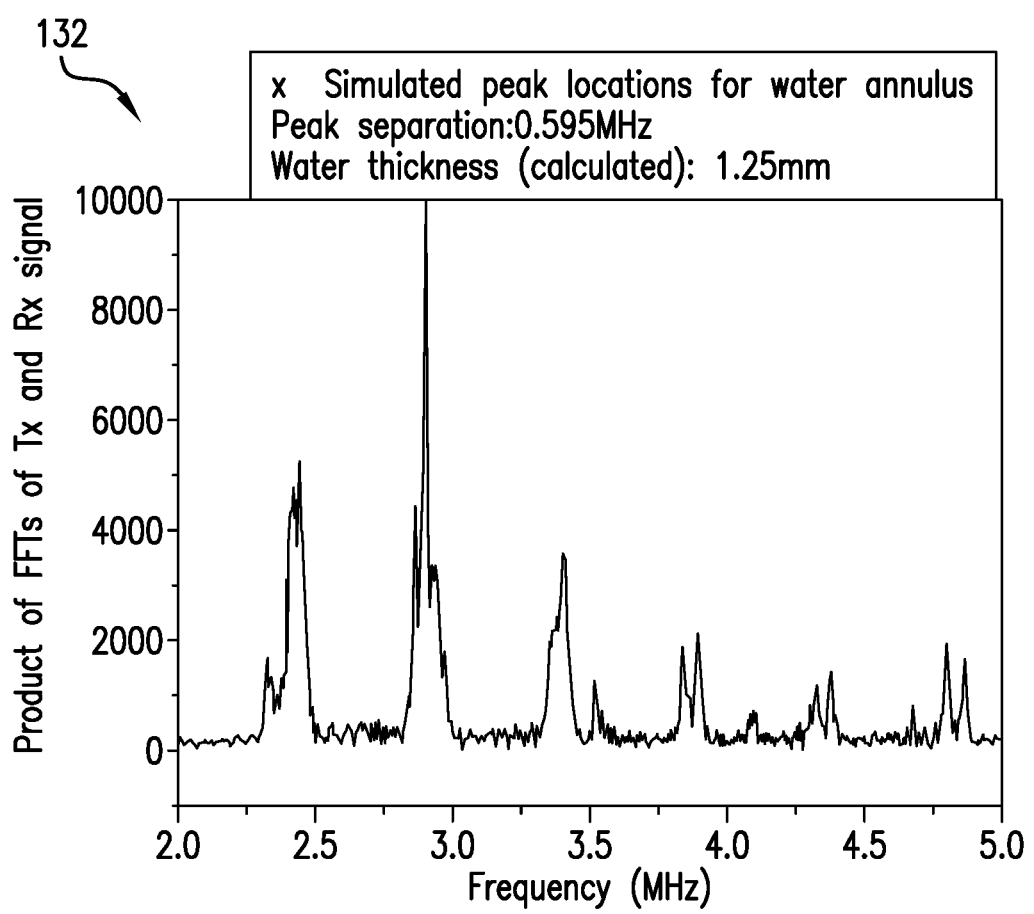
FIG. 7 is an illustrative representation of a waveform for annulus filled with water in the experimental set-up of FIG. 4.

FIG. 6 is an illustrative representation showing waveforms 128 and 130 that are processed for reflected resonances for the steel layers 106 and 108 respectively (also referred as SS (Stainless Steel) Block 1 and SS Block 2 respectively in the FIG. 6). The reflected resonances for the steel layer 106 and 108 are resonances for 0.478 Mega Hertz (MHz). The distance between peaks of these resonances is calculated as 5.97 mm for steel layer 106, and 6.06 mm for steel layer 108. FIG. 7 is a waveform representation 132 that is processed for the water filled annulus layer 110. The reflected resonances for frequency of 0.595 MHz is indicative of presence of water, and the distance between peaks of these resonances is indicative of the diameter of the annulus in which water is present. This distance is calculated as 1.25 mm using the distance between the peaks.

Figure 8:
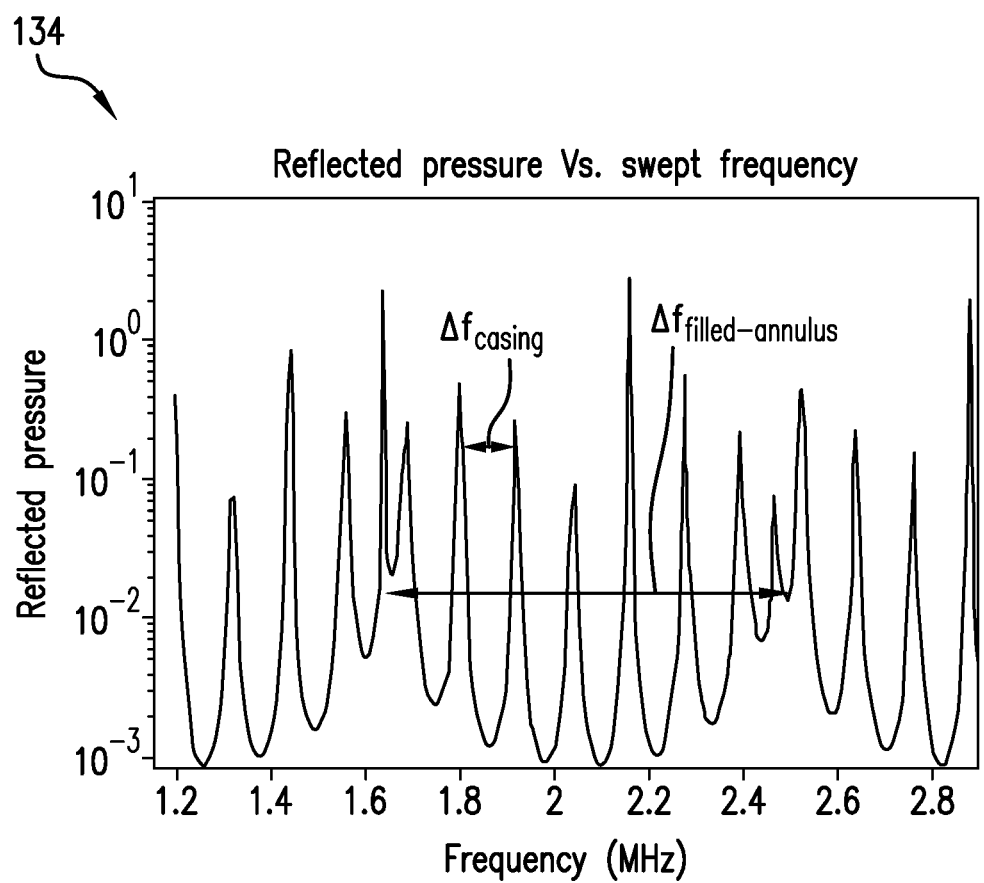
FIG. 8 is a representation of modelled reflected resonances in the resonance model described herein above.

FIG. 8 is a representation of modelled reflected resonances, shown as a graphical output 134 of reflected pressure against swept frequencies in the resonance model described herein above. As seen in FIG. 8, the peaks related to $\Delta f_{casing}$ are indicative of reflected resonances from the steel casing layer, and $\Delta f_{casing}$, as a difference between the consecutive peaks associated with steel casing layer, indicate the thickness of the steel casing layer. Similarly, peaks related to $\Delta f_{filled-annulus}$ are indicative of reflected resonances from the annulus, and $\Delta f_{filled-annulus}$ as a difference between the consecutive peaks associated with annulus, indicate the thickness of the annulus layer.

Figure 9:
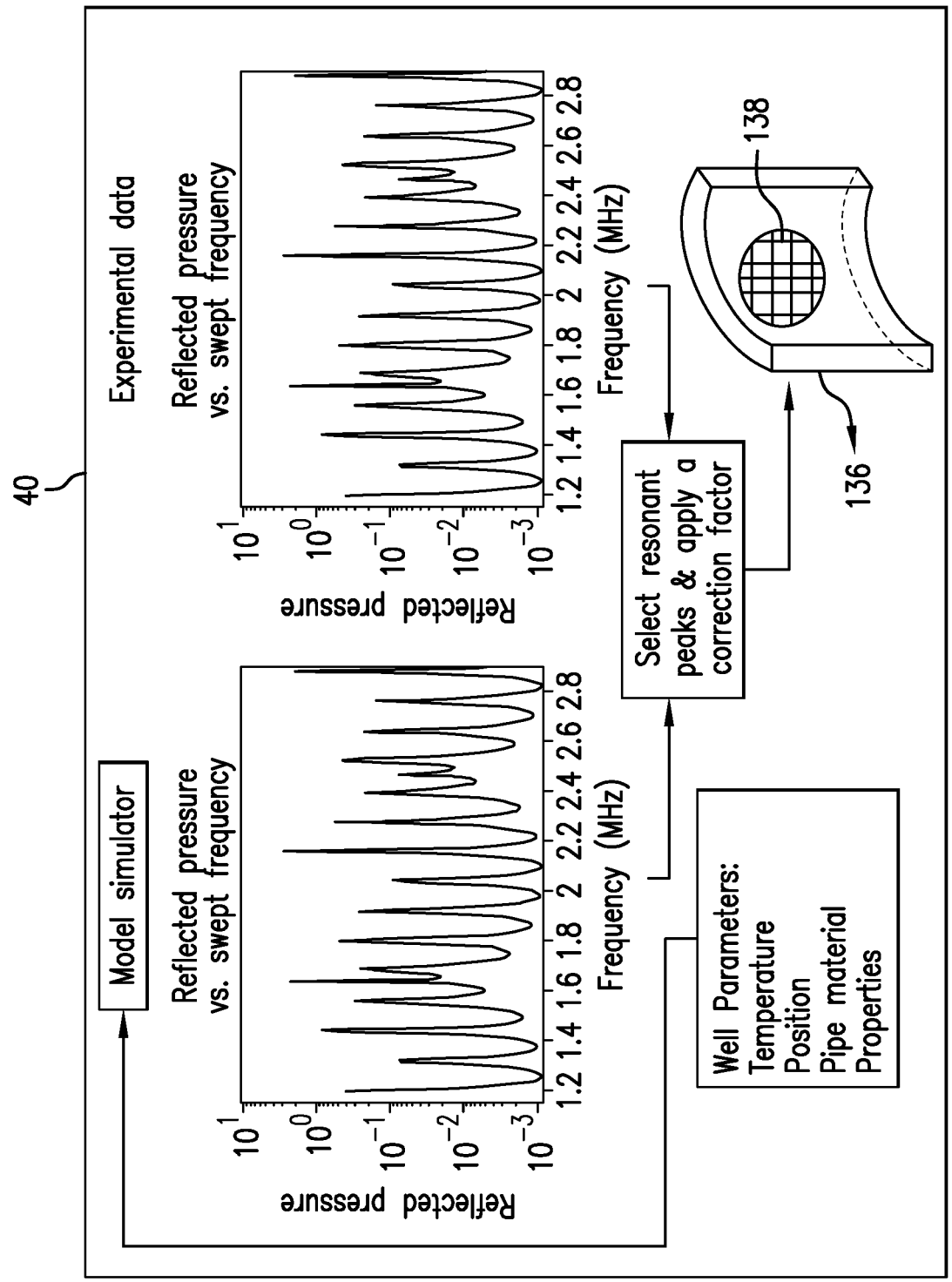
FIG. 9 is a diagrammatic representation of select processing steps performed in the processor of apparatus of FIG. 2.

FIG. 9 is a diagrammatic representation of processor 60 showing select processing steps to generate a geometry characterization image 136 and annulus dimension 138 described herein above that are obtained as an output of the processor described in reference to FIG. 2.

Figure 10:
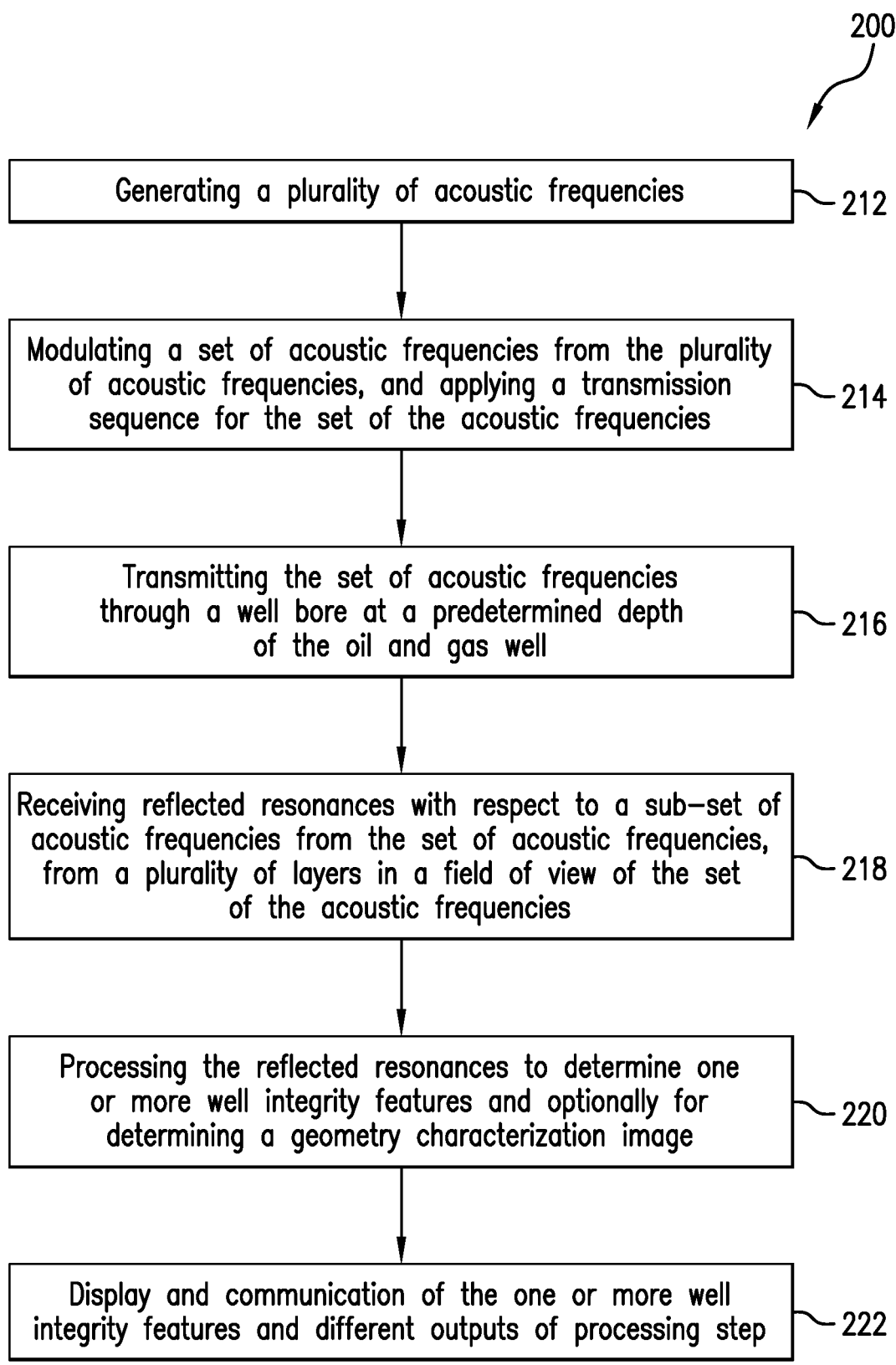
FIG. 10 is a flowchart representation of a method for testing well integrity according to one aspect of the invention.

FIG. 10 is a flowchart representation 200 of a method for determining well integrity of a hydrocarbon-producing well. The method is implemented at a pre-determined depth inside a well bore of the hydrocarbon-producing. The method includes a step 212 for generating multiple acoustic frequencies. As explained herein above, the acoustic frequencies are derived from a bulk wave having frequencies in the range of about 1-10 Mega Hertz (MHz).

The method includes a step 214 for modulating a set of frequencies from the multiple frequencies, for transmitting them in a transmission sequence through well integrity layers, and a step 216 for receiving reflected resonances from different well integrity layers, for at least a subset of acoustic frequencies from the set of transmitted frequencies. The method includes a step 218 for processing the reflected resonances, as described herein above in reference to the exemplary apparatus.

The method further includes a step 220 for determining one or more well integrity features based on reflected resonances (referred also as output of processing or processor in some embodiments). The method also includes a step 222 for communicating the output of processing step to a display unit. The processor output may be further communicated to an external communicating device for any control and maintenance actions based on the processor output. The different techniques for transmission of multiple frequencies, reception of reflected resonances, and processing of the reflected resonances have already been described in reference to the exemplary apparatus of the invention.

Thus the apparatus and method described herein provide a non-destructive testing method for determining presence or absence of micro-annuli in any of the material layers or in the interfaces of different material layers present at depths of beyond 1000-3000 meters of an oil and gas well, as well as cement de-bonding, and extent of such de-bonding at the well casing and cement interface. The apparatus and method also further includes determining one or more of a thickness of each of the layer, a presence of a micro-annulus, detection of medium or fluid in the annulus, and a thickness of the micro-annulus based on the reflected resonances.

It is recognized that traditional methods of logging the integrity of tubing or casing in a wellbore may not be sufficient due to not enough energy being transmitted out to the cement in the annuli or returned to the receivers to give a useful or meaningful measurement. Also, measurements performed using traditional methods degenerate further with eccentricities or offset of tubulars disposed within tubulars from a perfectly concentric geometry. To overcome these challenges, novel acoustic measurement techniques are disclosed that use a contact or proximity-based pad mounted sensor array system that is acoustically impedance matched to the casing or tubing in proximity or in contact with each pad in the array. In addition, advanced digital signal processing techniques are used to determine the offset of a casing and/or tubing of interest with respect to another casing and/or tubing surrounding the casing and/or tubing of interest to provide more accurate measurements for imaging dimensions and scales of cavity defects and delamination defects in cement in the annuli.

Figure 11:
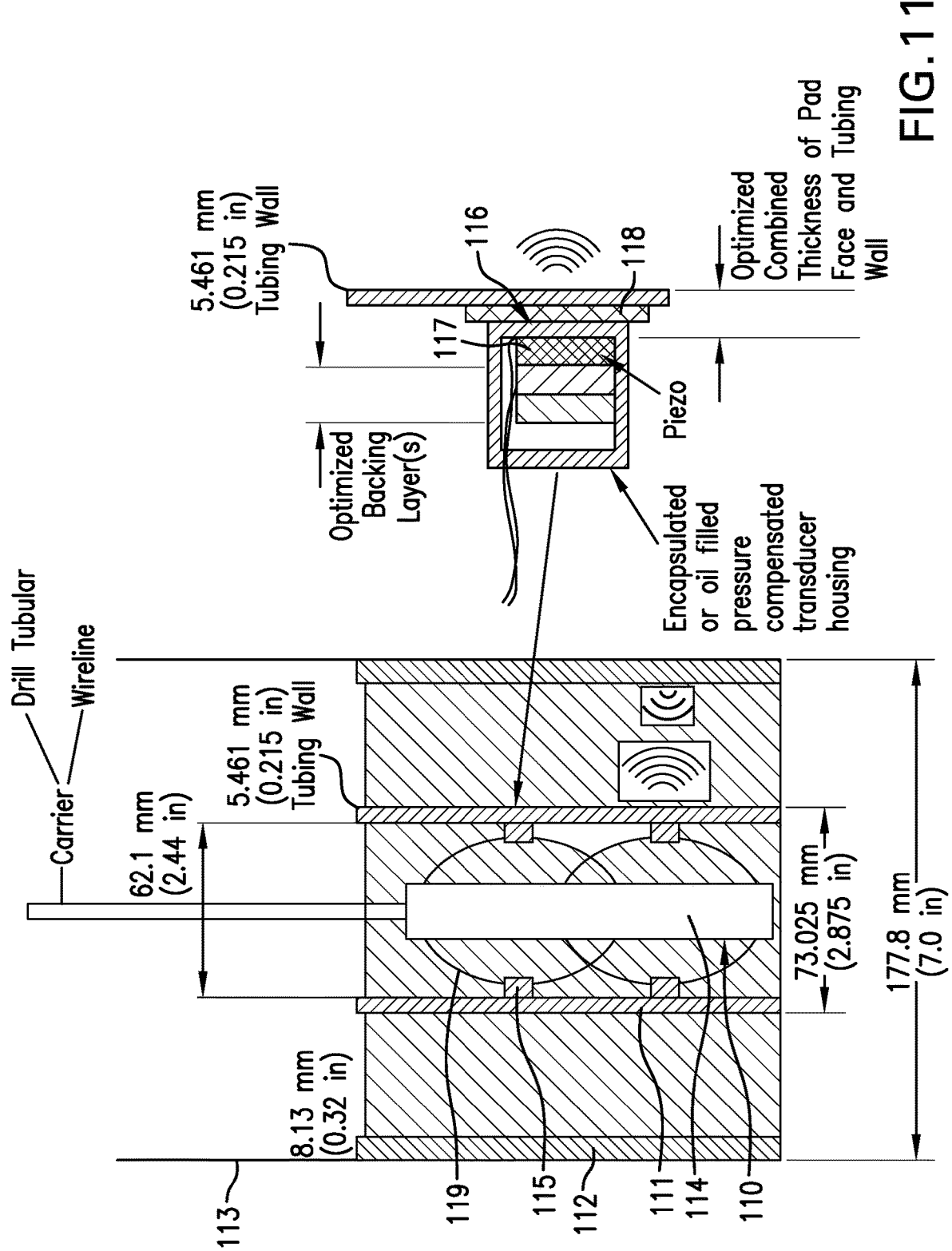
FIG. 11 illustrates a cross-sectional view of a well inspection tool disposed in a tubular concentric to a casing.

FIG. 11 illustrates a cross-sectional view of a well inspection tool 110 disposed in a tubular 111. The tubular 111 is concentric to a casing 112 that is disposed in a wellbore 113. The well inspection tool 110 may be coupled to and conveyed by a carrier such as a wireline for wireline logging or drill tubular for logging-while-drilling (LWD) in non-limiting embodiments. The well inspection tool 110 includes a body or mandrel 114 and a plurality of pad assemblies 115 that are extendable from the mandrel 114 to be in contact with or in proximity to the casing 112. The term "in proximity to" relates to being close enough to an adjacent tubular to transmit sufficient acoustic energy from an acoustic transducer mounted on a pad in the pad assembly 115 into the adjacent tubular to perform an acoustic measurement. Each pad assembly 115 includes an acoustic transducer 117 having a pad or sensing face 116 that emits and/or receives acoustic waves Non-limiting embodiments of the acoustic transducer 117 include (1) an electrical acoustic transducer, which converts electrical energy to acoustic energy and/or acoustic energy to electrical energy and (2) an electromagnetic acoustic transducer (EMAT). On example of the electrical acoustic transducer is a piezoelectric acoustic transducer that generally requires contact with a tubular of interest. The EMAT is a transducer for non-contact acoustic wave generation and reception in conducting materials. Its effect is based on electromagnetic mechanisms, which do not need direct coupling with the surface of the material. Due to this couplant-free feature, EMATs are particularly useful in harsh environments such as downhole environments. EMATs are suitable to generate all kinds of waves in metallic and/or magnetostrictive materials. Depending on the design and orientation of coils and magnets, shear horizontal (SH) bulk wave mode (norm-beam or angle-beam), surface wave, plate waves such as SH and Lamb waves, and all sorts of other bulk and guided-wave modes can be excited. There are two basic components in an EMAT transducer. One is a magnet and the other is an electric coil. The magnet can be a permanent magnet or an electromagnet, which produces a static or a quasi-static magnetic field. The electric coil is driven with an alternating current (AC) electric signal at ultrasonic frequency, generally in the range from 20 kHz to 10 MHz. Based on the application needs, the signal can be a continuous wave, a spike pulse, or a tone-burst signal. The electric coil with AC current also generates an AC magnetic field. When the tubular of interest is close to the EMAT, ultrasonic waves are generated in the test material through the interaction of the two magnetic fields. The EMAT can also be used to receive acoustic waves and convert these waves to an electrical signal. In that electrical acoustic transducers and EMATs are known in the art, they are not discussed in further detail herein.

Each pad assembly 115 is coupled to an arm 119 that is extendable from the mandrel 114. The arm 119 can be spring loaded or extended by an actuator (not shown) such as an electrically operated actuator for example. The arm 115 is configured to be extended so that the corresponding pad assembly 115 is in contact with or in proximity to the tubular. In one or more embodiments, the mandrel 114 is configured to rotate to provide azimuthal scanning. The mandrel 114 can be supported by bearings (not shown) and coupled to an electric motor (also not shown) to enable rotation of the mandrel 114. Alternatively or in addition, azimuthal coverage can be obtained by an array of the acoustic transducers 117 arranged and distributed along a circumference of the mandrel 114.

Disposed on a sensing face 116 of each acoustic transducer 117 is an acoustic impedance matching material (AIMM) 118. The purpose of the AIMM 118 is to maximize the transmission or reception of acoustic energy by the acoustic transducer 117 by employing acoustic impedance matching. The AIMM 118 has an acoustic impedance that matches (or is within a selected range) the acoustic impedance of the sensing face at the transducer end of the AIMM 118 and another acoustic impedance at the end contacting or in close proximity to the tubular into which acoustic energy is transmitted or from which it is received. The other acoustic impedance matches or is within a selected range of the acoustic impedance of the tubular. In non-limiting embodiments, an acoustic impedance transition section from one end to the other end transitions the acoustic impedance of the AIMM 118 by one or more steps having intermediate acoustic impedance values or the acoustic impedance transition can be a smooth continuous transition or the acoustic impedance transition can be some combination of the foregoing.

An example of selecting the AIMM 118 for a piezoelectric acoustic transducer in contact with or in proximity to a steel tubular is now discussed.

Acoustic Impedance of Material=Density of Material×Speed of Sound in Material

Acoustic Impedance of Steel=Density of Steel× Speed of Sound in Steel=47 MRayls

Acoustic Impedance of Piezoceramic=Density of Piezoceramic×Speed of Sound in Piezoceramic=30 MRayls To transfer the optimal amount of energy transfer from the vibrating piezo-electric transducer material to another medium such as air, water or steel, an intermediate quarter wavelength matching layer is used that has an effective impedance that is the square root of the product of piezo impedance generally of 30 MRayls and steel impedance generally of 47 MRayl giving 37.5 MRayl. In one or more embodiments, a hard ceramic material that is wearproof is selected as the AIMM 118.

On the other hand, if a piezocomposite (17 to 20 MRayls) transducer is used, then a matching layer of impedance (=sqrt (17×47)=28 MRayls) is needed to match to steel of impedance 47 MRayls. In this case, titanium, which has 27MRayls impedance can be selected.

In one or more embodiments, a layered metamaterial matching layer is constructed on a piezocomposite transducer using titanium and a machinable glass ceramic to build the pad with a final thin titanium wear coating where a transitional or graded impedance is created from Piezocomposite (17 to 20 MRayl) to Steel (47 MRayl). In one or more embodiments, the ATIMM 118 includes a multilayer structure defining an internal cell structure. In one or more embodiments, the internal cell structure includes a selected structural shape such as honeycomb or horn (e.g., a shape having a varying inner diameter to provide a horn-like shape) for example. It can be appreciated that the multilayer structure can be fabricated using additive manufacturing techniques known in the art.

Figure 12A:
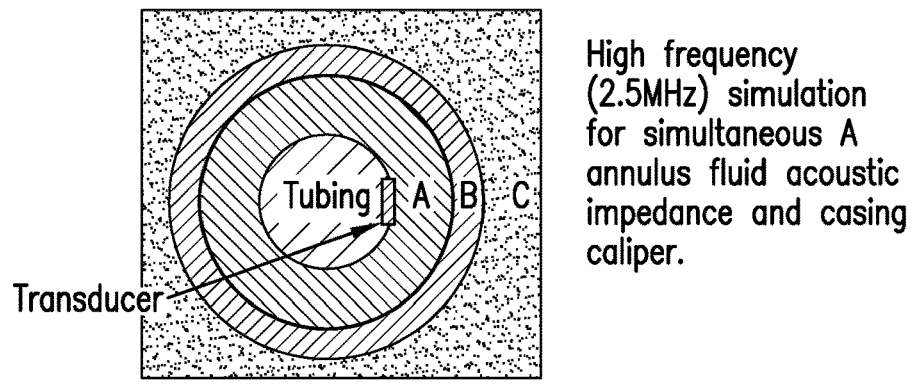
FIGS. 12A-12E depict aspects of determining an annulus distance between a tubular disposed in another tubular.
Figure 12B:
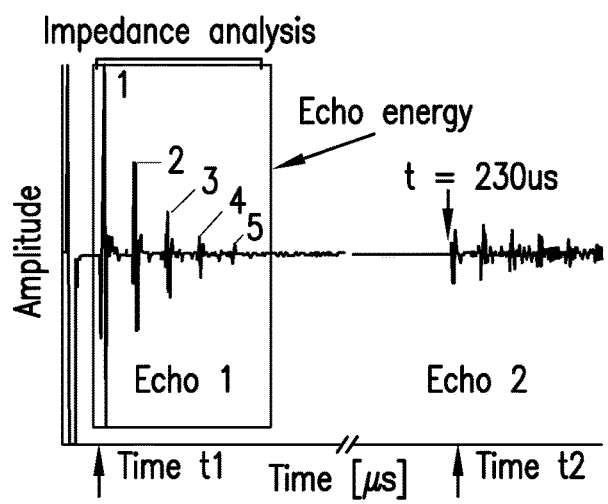
Figure 12C:
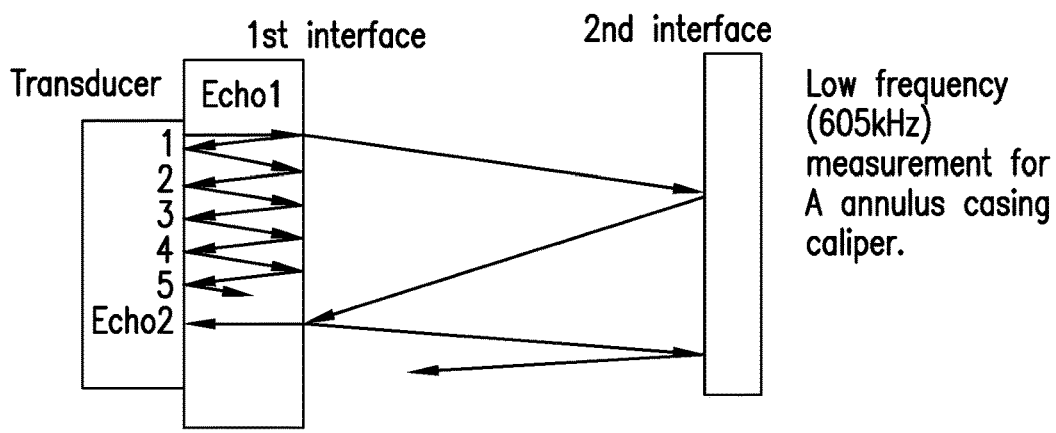
Figure 12D:
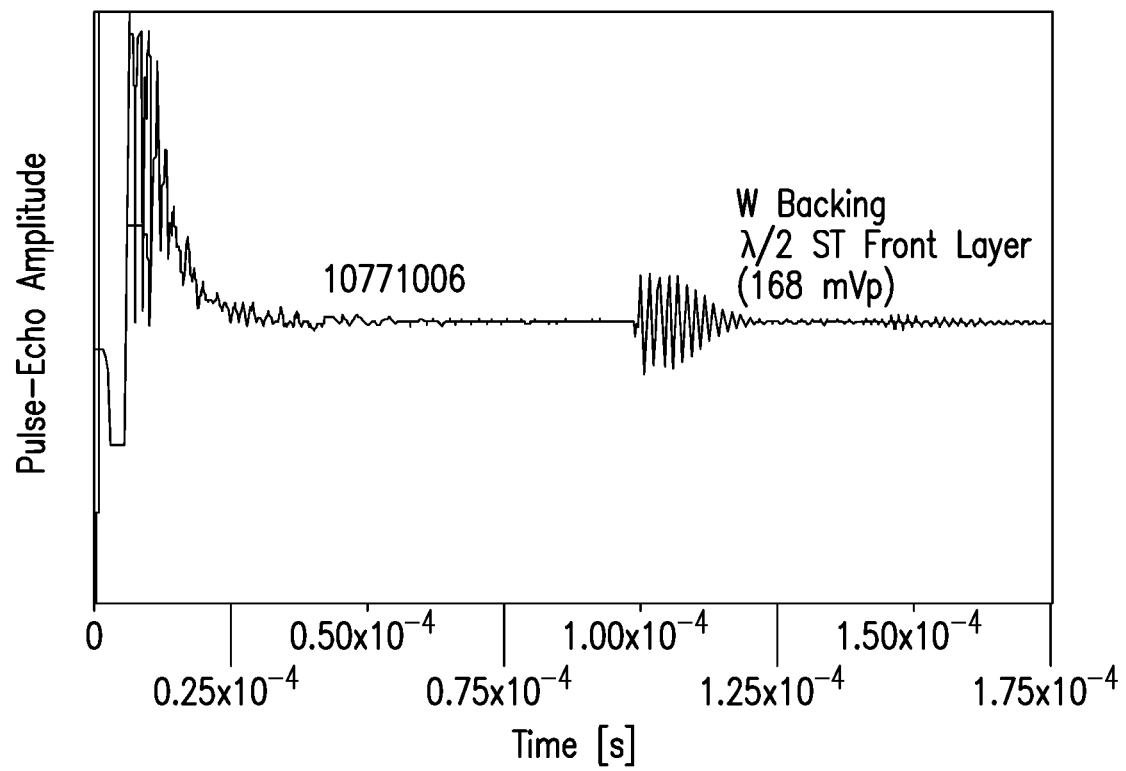
Figure 12E:
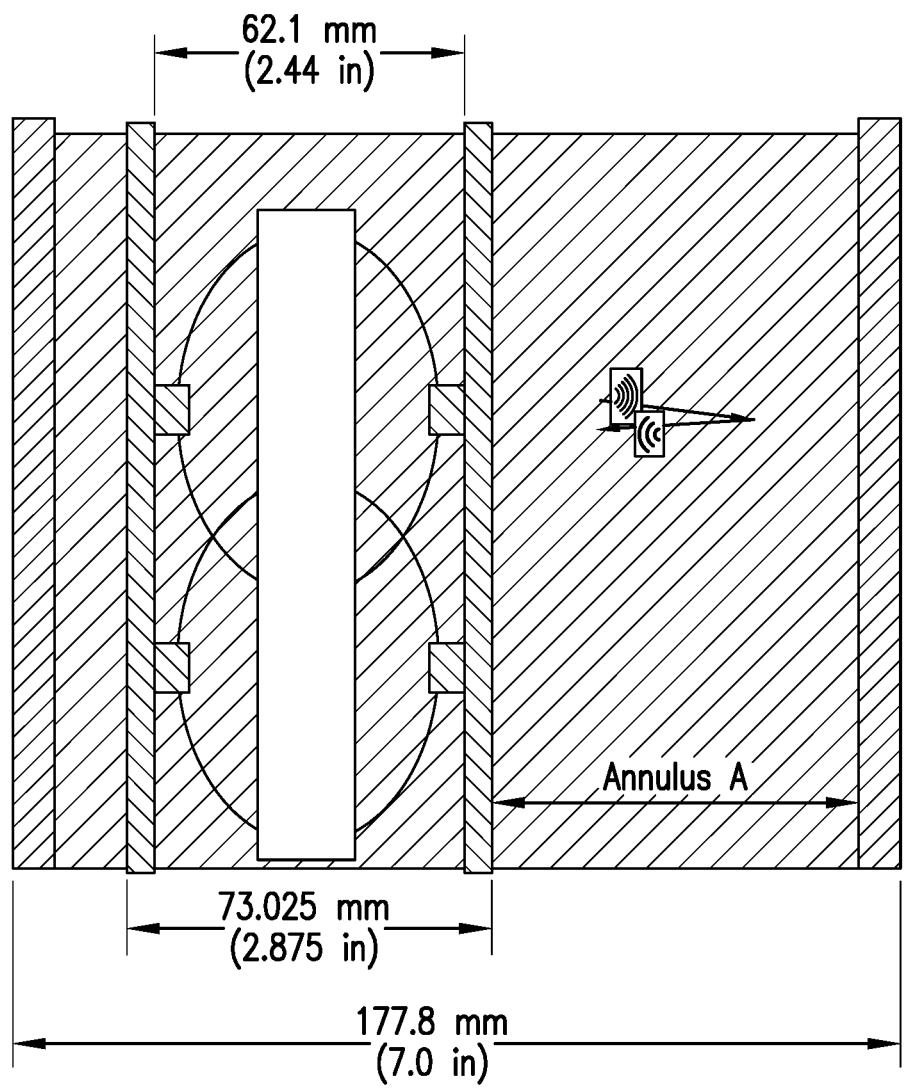

Measuring an annulus distance and, hence, an eccentricity or offset distance with respect to one tubular disposed within another tubular is discussed next. FIG. 12A illustrates a top view of an embodiment for measuring the offset distance. In the embodiment of FIG. 12A, a metal tubular is disposed within a casing with fluid "A" in the annulus between the tubular and the casing. The casing is cemented in annulus "B" to formation "C." A 2.5 MHz acoustic signal is emitted by the acoustic transducer. FIG. 2E illustrates the offset of the metal tubular with respect to the casing in a side view. FIG. 12B illustrates acoustic echoes received by the acoustic transducer. As illustrated in FIG. 12C, Group 1 Echoes relate to echoes due to reflections from the metal tubular and Group 2 Echoes relate to echoes received reflections from the casing. FIG. 12D illustrates the time of flight of the echoes in the Group 2 Echoes. By knowing the time of flight $t_{1st\ echo}$ of the first echo in the Group 2 Echoes and the speed of sound $c_A$ in the annulus "A" material, the annulus distance AD can be calculated as $$AD=(c_A \times t_{1st\ echo})/2.$$

Figure 13:
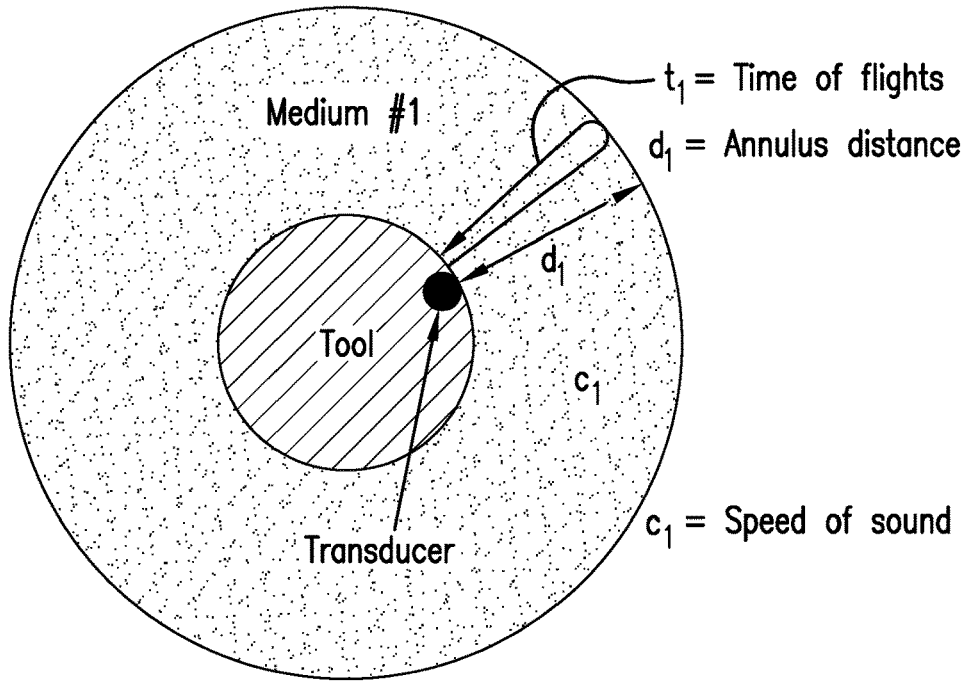
FIG. 13 depicts aspects of an iterative method for calculating the annulus distance.
Figure 13:
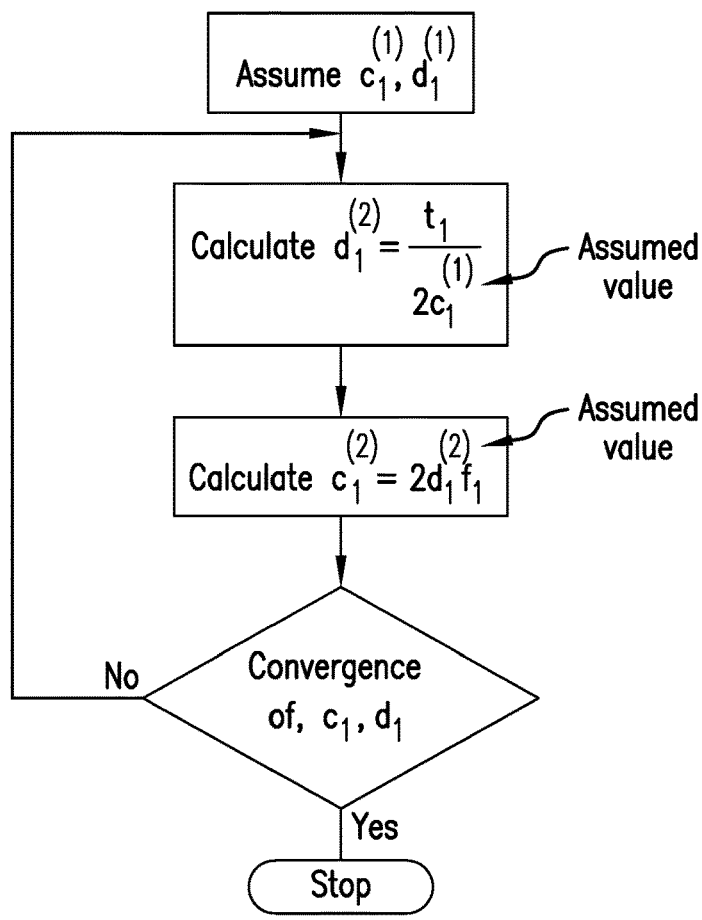

FIG. 13 provides an illustration of an iterative method for calculating AD and $c_A$. If the annulus distance is the same as the known annulus distance for perfect concentricity, then the offset distance or eccentricity is zero.

As noted above with respect to Equations 1, 2 and 3 in the discussion of resonance analysis further above, the spacing between two consecutive resonances depends only on the speed of sound in that medium and the length of the medium. If the length of the medium is known, the speed of sound in the medium can be determined by finding the frequency spacing between the resonances. From this, the medium may be identified. Thus, if the length of the medium is not known accurately, then the speed of sound cannot be determined accurately and the medium may not be correctly identified. Hence, the measurement of the annulus distance or length provides a more accurate length dimension for the determination of the speed of sound in the medium and, consequently, a more accurate identification of the medium.

Another type of measurement may also be performed to determine the integrity of cement or other material in an annulus between two tubulars. The term "integrity" is inclusive of the presence or absence as well as the quality or degradation of the cement or other material in the annulus.

Figure 14:
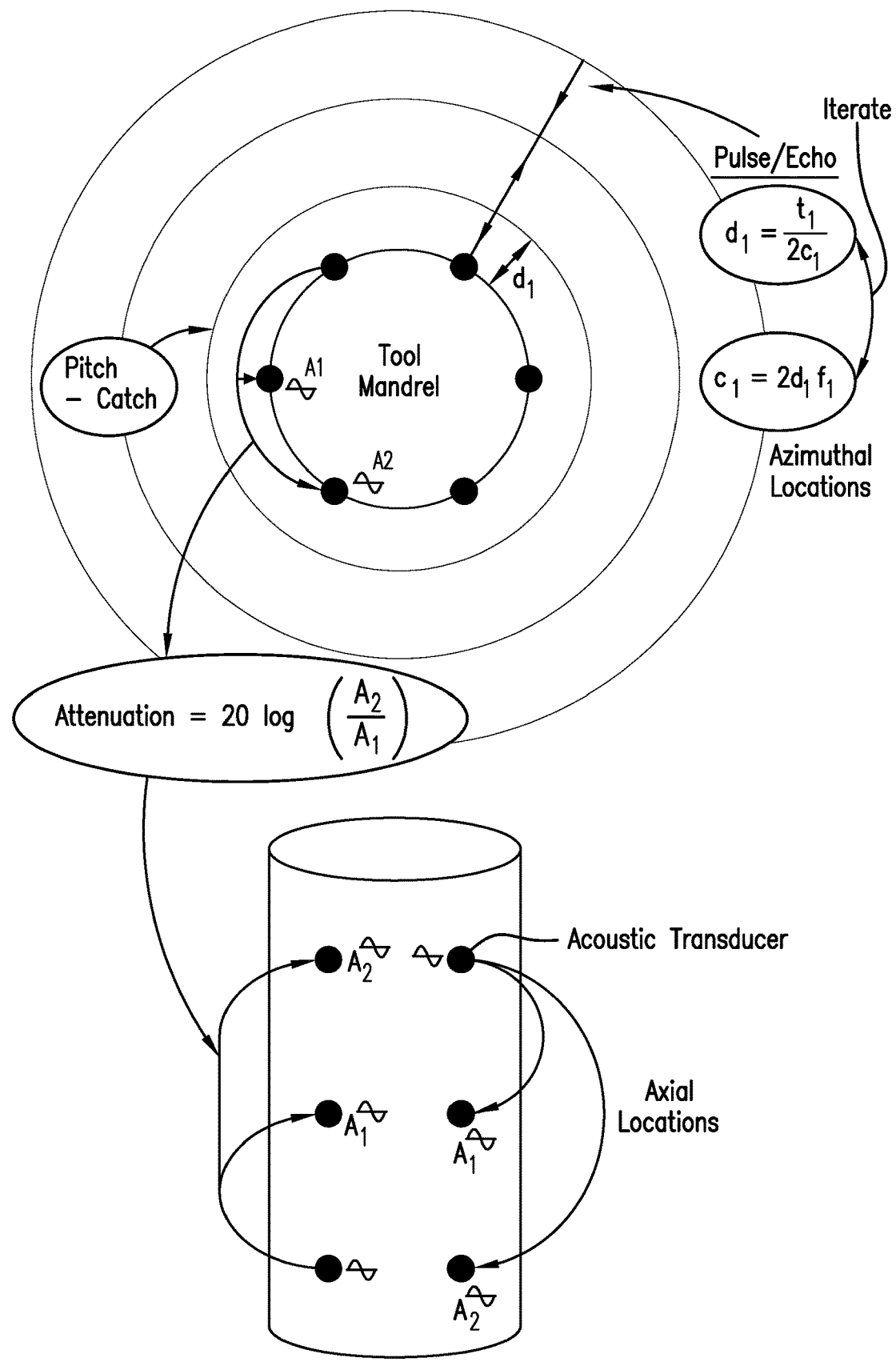
FIG. 14 depicts aspects of a method for calculating attenuation of received acoustic waves using an azimuthal and axial distribution of acoustic transducers for a "pitch-catch" configuration.

The term "quality or degradation" can include cement with proper bonding, cement with failed bonding, and cement with different sized cracks. This type of analysis is an amplitude or energy analysis of echoes received by at least two acoustic transducers spaced a known distance apart. By knowing that the acoustic impedance of cement is greater than that of air or a gas, the amplitude or energy of received acoustic waves will degrade more over distance traveling in the cement than the amplitude or energy of received acoustic waves traveling in the air or gas. By using two or more spaced acoustic transducers to receive transmitted acoustic waves, the attenuation of amplitude can be plotted and mathematically characterized and then correlated to a condition of the cement or other material. Different reference values for the correlation can be obtained by testing in a laboratory or field conditions or by analysis. For example, reference values can be obtained for cement with proper bonding, cement with failed bonding, and cement with different sized cracks. FIG. 14 provides an illustration of a method for calculating attenuation of received acoustic waves using a "pitch-catch" transducer configuration. In the pitch-catch configuration, a transducer transmits an acoustic signal into the tubular and at least two transducers spaced apart receive the acoustic signal with attenuation due to the signal traveling in the annulus. The spacing between the receiving transducers can be axial or azimuthal id also illustrated in FIG. 14. Other configurations may also be used.

Figure 15:
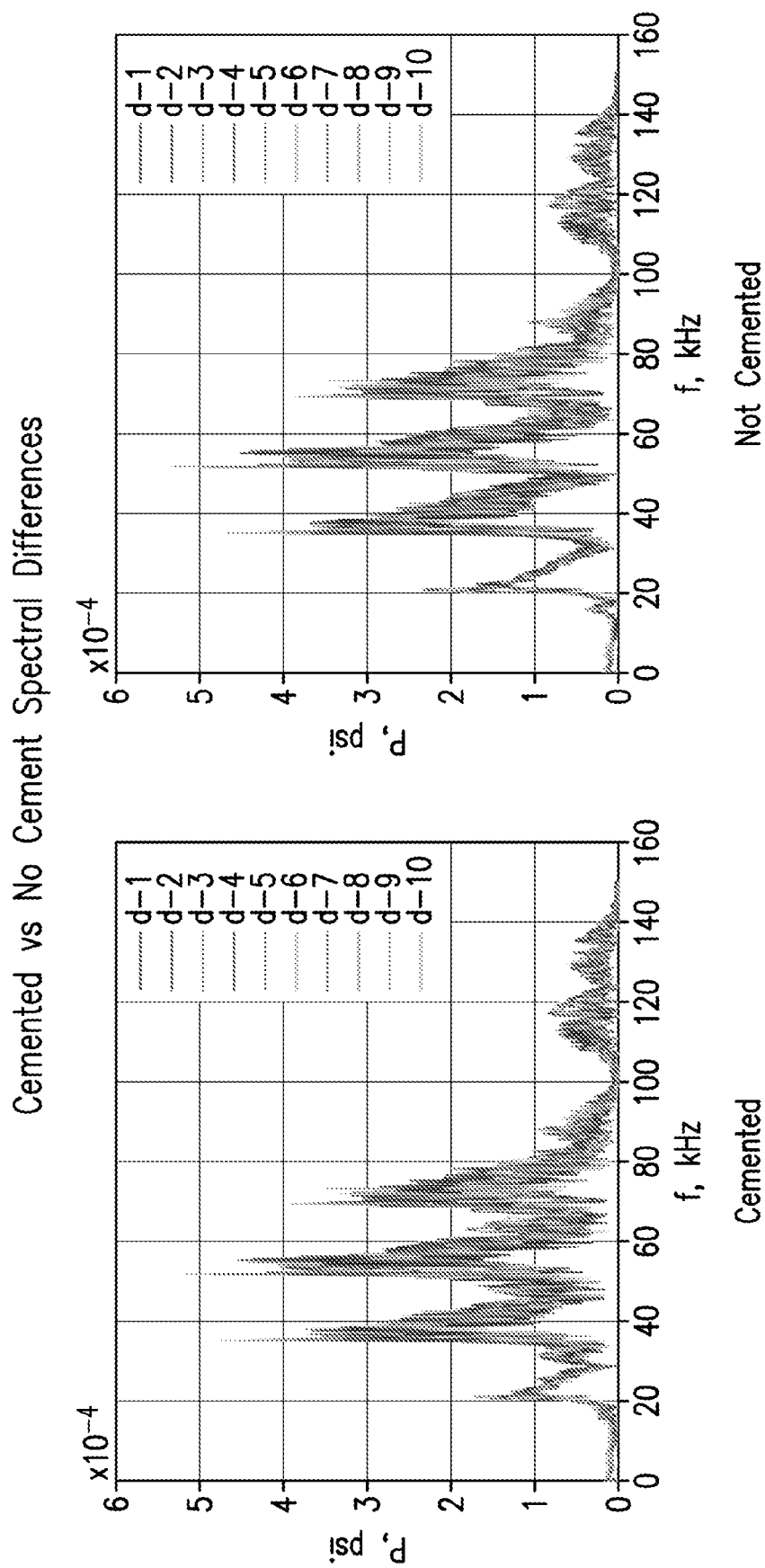
FIG. 15 depicts aspects of a spectrum for a cemented annulus and a spectrum for a non-cemented annulus.

Other measurement and analysis techniques may also be employed to improve the efficiency, quality and/or accuracy of measurements. For example, the same pad-based sensors may be used to emit acoustic and or ultrasonic broadband pulses in the range of 50 kHz to 1 MHz range into the multistring configurations downhole and receive the returned pulses at the same emitting transducer or another displaced transducer. The received pulses are processed to calculate temporal, frequency, spatial characteristics of phase and group pulses to determine the presence or absence of cement as well debonding on the casing to cement as well as debonding at the cement to formation interface. FIG. 15 illustrates an example of a spectrum for a cemented annulus and a spectrum for a non-cemented annulus. Each spectrum may be obtained by applying a Fourier transform to received acoustic signals. In FIG. 15, the terms d1-d10 relate to ten receiver transducers forming an axial array for a pitch-catch numerical simulation.

Chirp, Spread spectrum and other compressed wide band pulsing methods can be used together with modulation such as Gaussian together with digital signal processing methods including the Modified Maximum Likelihood method to emit, detect and process the signals for cement characterization. For example, one technique includes using the one-sided Double Blackman Harris Window with swept frequency acoustic interferometry (SFAI). Optimized frequency spectrum for signal using the Spread spectrum with Double Blackman Harris Window with Gaussian modulation is used to suppress sidelobes and modulate the pulse to make the SFAI measurement in practice. Without this technique in conventional tools, it would typically take 100 to 200 us (microseconds) to do and the tool would have moved in that time preventing averaging and thus lower the signal-to-noise ratio (SNR). Spread spectrum in the disclosed pad configurations shortens pulses to get over the threshold to be less than the 100 to 200 μs, thus allowing averaging and increased SNR while the inspection tool is moving. The Modified Maximum Likelihood method is used to gate the received signal to improve SNR by −20 to −40 dB or more in some cases.

Optimized coded (i.e., a digital code) or chirp frequency acoustic interferometry may be used for micro-annulus detection.

Multi-layered structure analysis from piezo impedance spectroscopy may be used to determine characteristics of a multi-layered structure. In this embodiment, complex voltage and complex current at a piezo-electric acoustic transducer are measured and used to determine the complex impedance related to the emitted and/or received acoustic signal. The complex impedance can then be correlated to a reference complex impedance that corresponds to a known condition or known material. The reference complex impedance for various known conditions and materials can be determined experimentally in the field or a laboratory or by analysis.

Figure 16:
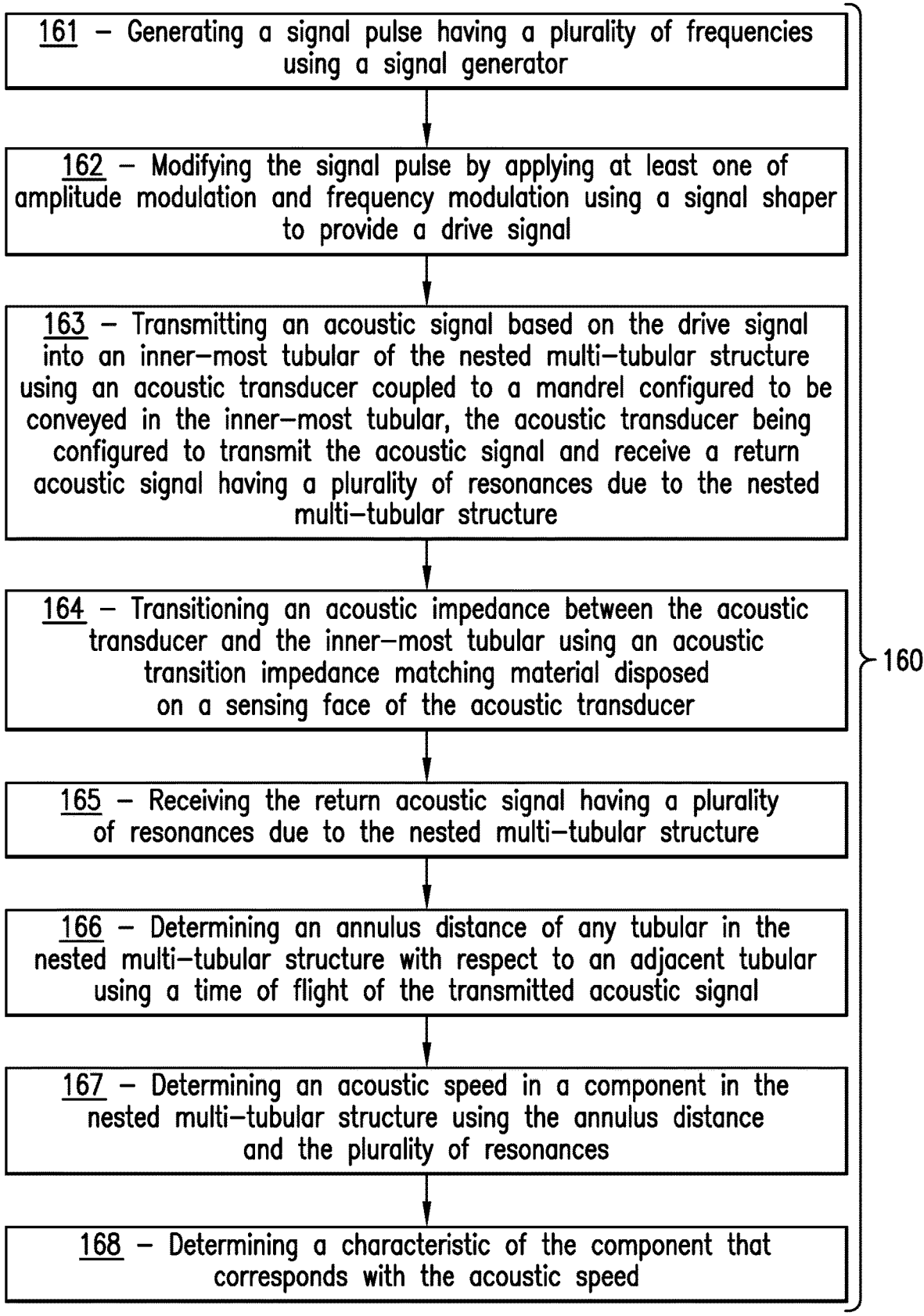
FIG. 16 is a flow chart for a method for inspecting a well having a nested multi-tubular structure.

FIG. 16 presents one example of a flow chart for a method 160 for inspecting a well having a nested multi-tubular structure. The term "nested multi-tubular structure" relates to tubulars being disposed axially or offset within each other as illustrated in FIG. 1. Block 161 calls for generating a signal pulse having a plurality of frequencies using a signal generator.

Block 162 calls for modifying the signal pulse by applying at least one of amplitude modulation and frequency modulation using a signal shaper to provide a drive signal.

Block 163 calls for transmitting an acoustic signal based on the drive signal into an inner-most tubular of the nested multi-tubular structure using an acoustic transducer coupled to a mandrel configured to be conveyed in the inner-most tubular, the acoustic transducer being configured to transmit the acoustic signal and receive a return acoustic signal having a plurality of resonances due to the nested multi-tubular structure. In one or more embodiments, the transmitting includes a first acoustic signal to determine the annulus distance, transmitting a second acoustic signal to determine the acoustic speed; and transmitting a third acoustic signal to determine the attenuation; wherein the first, second, and third acoustic signals are transmitted in any order or a selected order.

Block 164 calls for transitioning an acoustic impedance between the acoustic transducer and the inner-most tubular using an acoustic transition impedance matching material disposed on a sensing face of the acoustic transducer.

Block 165 calls for receiving the return acoustic signal having the plurality of resonances using the acoustic transducer. The acoustic transducer can be a single acoustic transducer for both transmitting the acoustic signal and receiving the return acoustic signal. Alternatively, the acoustic transducer can include a plurality of acoustic transducers where one or more of the acoustic transducers transmit the acoustic signal and one or more other acoustic transducers receive the return acoustic signal. In one or more embodiments, the acoustic transducer includes a plurality of distributed acoustic transducers to form an acoustic transducer array having at least two acoustic transducers spaced apart and the method further comprises determining an attenuation in amplitude or energy between return acoustic signals received by the at least two acoustic transducers and correlate the attenuation to a condition of material in an annulus surrounding the inner-most tubular.

Block 166 calls for determining an annulus distance of any tubular in the nested multi-tubular structure with respect to an adjacent tubular using a time of flight of the transmitted acoustic signal. In general, the annulus distance is inclusive of offset from a normalized concentric annulus distance (i.e., having perfect or near perfect concentricity). An offset of zero is indicative of the annulus distance being the same as the normalized concentric annulus distance.

Block 167 calls for determining an acoustic speed in a component in the nested multi-tubular structure using the annulus distance and the plurality of resonances. In one or more embodiments, the component can be a bonding medium or tubular structure.

Block 168 calls for determining a characteristic of the component that corresponds with the acoustic speed.

The method 160 may also include extending the acoustic transducer from the mandrel to be in contact with or close proximity to the inner-most tubular.

The method 160 may also include: detecting return signals at a plurality of times; processing the return signals using a frequency transform to identify frequency peaks present in the return signal; and correlating the identified peaks to a characteristic of the nested multi-tubular structure.

The method 160 may also include dynamic focusing of the transmitted acoustic signal using at least one of time multiplexed pulse sequence or phase sequence to focus the transmitted acoustic signal at a selected area or to move the focus area to cover a larger area such as to provide for example azimuthal and/or longitudinal scanning over the larger area.

Figure 17:
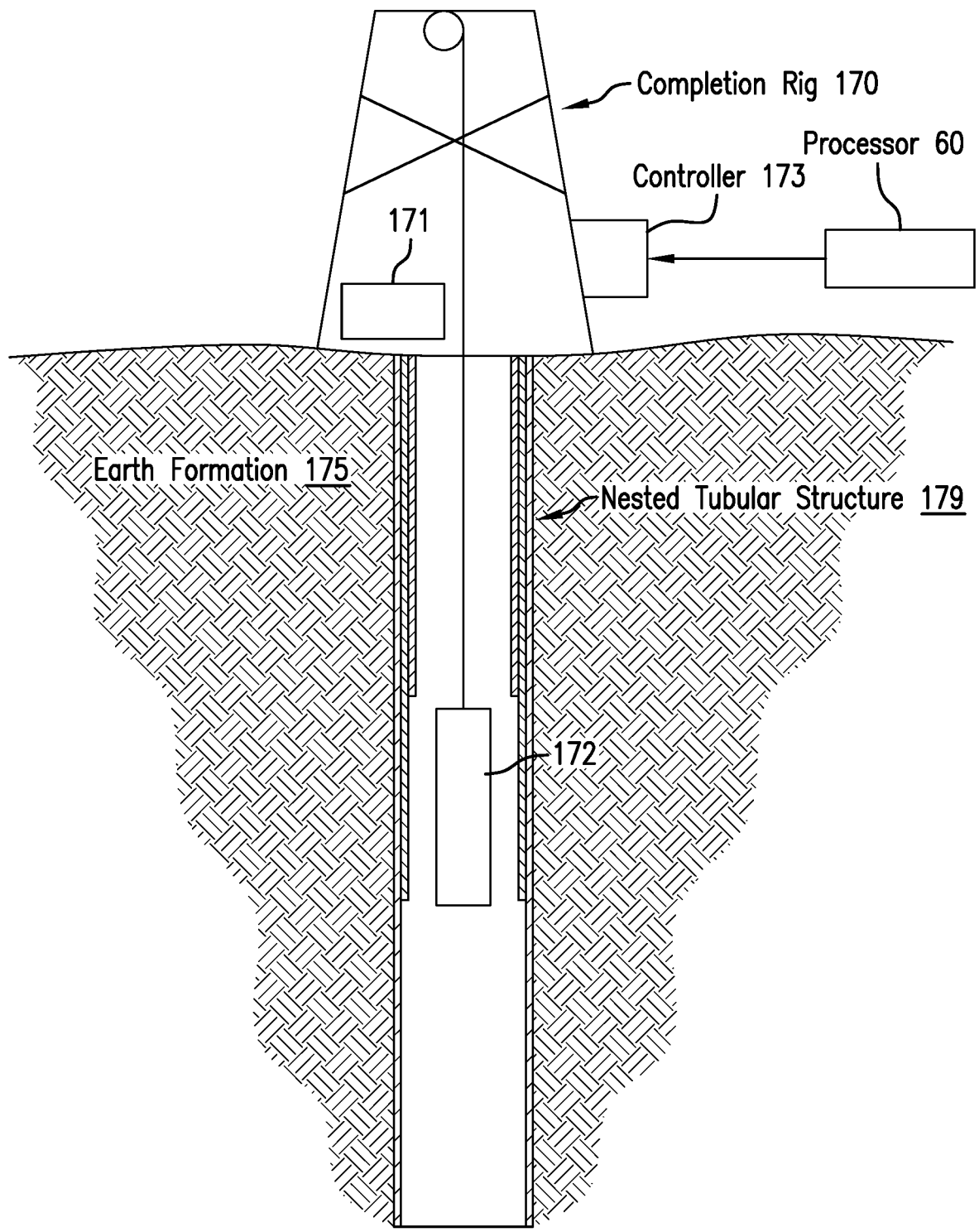
FIG. 17 illustrates a cross-sectional view of a completion rig for repairing or remediating a defect in a subsurface component.

The method 160 may also include repairing or remediating a defect in the component based on the determined characteristic of the component. Non-limiting examples of the defect include a cavity of various sizes in a bonding material such as cement for example, delamination of a bonding material, and a crack in a tubular. The defect may be repaired or remediated using a completion rig 170 illustrated in a cross-sectional view in FIG. 17. FIG. 17 illustrates a nested tubular structure 179 that includes three nested tubulars. The nested tubulars may be bonded to each other or to an earth formation 175 using a bonding material (not shown) such as cement. The completion rig 170 includes one or more surface tools 171 for performing surface operations (e.g., cement pumping) associated with the repair or remediation and one or more downhole tools 172 for performing subsurface operations (e.g., grinding, welding, or applying cement) associated with the repair or remediation. The one or more downhole tools 172 may be conveyed by an armored wireline or a tubular string in non-limiting embodiments. The completion rig 170 may also include a controller 173 for controlling the repair or remediation operations. The controller 173 may be configured to accept manual input and/or automatic input (e.g., from the processor 60) for controlling the repair or remediation operations where the inputs are based on the determined characteristic of the component. In that completion rigs and associated tools are well-known, they are not discussed herein in further detail.

In support of the teachings herein, various analysis components may be used, including a digital and/or an analog system. For example, the well inspection tool 110 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply, magnet, electromagnet, sensor, electrode, transmitter, receiver, transceiver, antenna, controller, optical unit or components, electrical unit or electromechanical unit may be included in support of the various aspects discussed herein or in support of other functions beyond this disclosure.

Set forth below are some embodiments of the foregoing disclosure:

Embodiment 1: An apparatus for inspecting a well having nested multi-tubular structure, the apparatus including an acoustic transducer coupled to a mandrel configured to be conveyed in an inner-most tubular in the nested multi-tubular structure, the acoustic transducer configured to transmit an acoustic signal and receive a return acoustic signal having a plurality of resonances due to the multi-tubular structure, an acoustic impedance matching material disposed on a sensing face of the acoustic transducer, a signal generator that generates a signal having a plurality of frequencies to drive the acoustic transducer, a signal shaper that modifies the signal by applying at least one of amplitude modulation and frequency modulation to provide a drive signal to the acoustic transducer, and a processor configured to (i) determine an annulus distance of any tubular in the nested multi-tubular structure with respect to an adjacent tubular using a time of flight of the transmitted acoustic signal, (ii) determine an acoustic speed in a component in the nested multi-tubular structure using the annulus distance and the plurality of resonances, and (iii) determine a characteristic of the component that corresponds with the acoustic speed.

Embodiment 2: The apparatus according to any prior embodiment, further including an extendable arm coupled to the mandrel and the acoustic transducer, wherein the acoustic sensor is extendable from the mandrel to be in contact with or close proximity to the inner-most tubular.

Embodiment 3: The apparatus according to any prior embodiment, wherein the mandrel is configured to rotate to provide azimuthal scanning.

Embodiment 4: The apparatus according to any prior embodiment, further including a carrier coupled to the mandrel, the carrier including a wireline or a drill tubular.

Embodiment 5: The apparatus according to any prior embodiment, wherein the signal is a signal pulse.

Embodiment 6: The apparatus according to any prior embodiment, wherein the acoustic transducer includes a plurality of distributed acoustic transducers spaced apart from each other to form an acoustic transducer array.

Embodiment 7: The apparatus according to any prior embodiment, wherein the distributed acoustic sensors are distributed azimuthally and/or axially with respect to the inner-most tubular.

Embodiment 8: The apparatus according to any prior embodiment, wherein the processor is further configured to (iv) determine an attenuation in amplitude or energy between return acoustic signals received by at least two acoustic transducers in the acoustic transducer array and (v) correlate the attenuation to a condition of a material in an annulus surrounding the inner-most tubular.

Embodiment 9: The apparatus according to any prior embodiment, wherein at least one acoustic transducer in the acoustic transducer array is configured to transmit a first acoustic signal to determine the annulus distance, transmit a second acoustic signal to determine the acoustic speed, and transmit a third acoustic signal to determine the attenuation, wherein the first, second, and third acoustic signals are transmitted in any order.

Embodiment 10: The apparatus according to any prior embodiment, wherein the drive signal is provided at least one of concurrently, coherently, or sequentially to the acoustic transducer array.

Embodiment 11: The apparatus according to any prior embodiment, wherein the processor is further configured to detect return signals at a plurality of times, process the return signals using a frequency transform to identify frequency peaks present in the return signal, and correlate the identified peaks to a characteristic of the nested multi-tubular structure.

Embodiment 12: The apparatus according to any prior embodiment, wherein the acoustic transducer includes an electric acoustic transducer and/or an electromagnetic acoustic transducer.

Embodiment 13: The apparatus according to any prior embodiment, wherein the acoustic transitional impedance matching material (ATIMM) includes (a) a first acoustic impedance at the sensing face within a selected range of an acoustic impedance of the sensing face and (b) a second acoustic impedance within a selected range of an acoustic impedance of the inner-most tubular.

Embodiment 14: The apparatus according to any prior embodiment, wherein the ATIMM includes a transitional acoustic impedance section disposed between two ends of the ATIMM, the transitional acoustic impedance section including a third acoustic impedance between the first acoustic impedance and the second acoustic impedance.

Embodiment 15: The apparatus according to any prior embodiment, wherein the ATIMM includes a multilayer material having a machinable glass ceramic and titanium.

Embodiment 16: The apparatus according to any prior embodiment, wherein the ATIMM includes a multilayer structure defining an internal cell structure.

Embodiment 17: A method for inspecting a well having a nested multi-tubular structure, the method including generating a signal pulse having a plurality of frequencies using a signal generator, modifying the signal pulse by applying at least one of amplitude modulation and frequency modulation using a signal shaper to provide a drive signal, transmitting an acoustic signal based on the drive signal into an inner-most tubular of the nested multi-tubular structure using an acoustic transducer coupled to a mandrel configured to be conveyed in the inner-most tubular, the acoustic transducer being configured to transmit the acoustic signal and receive a return acoustic signal having a plurality of resonances due to the nested multi-tubular structure, transitioning an acoustic impedance between the acoustic transducer and the inner-most tubular using an acoustic transition impedance matching material disposed on a sensing face of the acoustic transducer, receiving the return acoustic signal having the plurality of resonances using the acoustic transducer, determining an annulus distance of any tubular in the nested multi-tubular structure with respect to an adjacent tubular using a time of flight of the transmitted acoustic signal, determining an acoustic speed in a component in the nested multi-tubular structure using the annulus distance and the plurality of resonances, and determining a characteristic of the component that corresponds with the acoustic speed.

Embodiment 18: The method according to any prior embodiment, further including extending the acoustic transducer from the mandrel to be in contact with or close proximity to the inner-most tubular.

Embodiment 19: The method according to any prior embodiment, wherein the acoustic transducer includes a plurality of distributed acoustic transducers to form an acoustic transducer array having at least two acoustic transducers spaced apart and the method further includes determining an attenuation in amplitude or energy between return acoustic signals received by the at least two acoustic transducers and correlate the attenuation to a condition of material in an annulus surrounding the inner-most tubular.

Embodiment 20: The method according to any prior embodiment, wherein transmitting includes transmitting a first acoustic signal to determine the annulus distance, transmitting a second acoustic signal to determine the acoustic speed, and transmitting a third acoustic signal to determine the attenuation, wherein the first, second, and third acoustic signals are transmitted in any order.

Embodiment 21: The method according to any prior embodiment, further including detecting return signals at a plurality of times, processing the return signals using a frequency transform to identify frequency peaks present in the return signal, and correlating the identified peaks to a characteristic of the nested multi-tubular structure.

Embodiment 22: The method according to any prior embodiment, further including dynamic focusing of the transmitted acoustic signal using at least one of time multiplexed pulse sequence or phase sequence.

Embodiment 23: The method according to any prior embodiment, further including at least one of repairing or remediating a defect of the component as identified by the determined characteristic of the component.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates to one or more structural limitations of a device that are required for the device to perform the function or operation for which the device is configured. The term "coupled" relates to being coupled directly or indirectly using an intermediate device. The terms "first" and "second" and like are used to distinguish terms and not to denote a particular order.

The flow diagram depicted herein is just an example. There may be many variations to this diagram or the steps (or operations) described therein without departing from the scope of the invention. For example, operations may be performed in another order or other operations may be performed at certain points without changing the specific disclosed sequence of operations with respect to each other. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for inspecting a well having a nested multi-tubular structure, the apparatus comprising:
   an acoustic transducer coupled to a mandrel configured to be conveyed in an inner-most tubular in the nested multi-tubular structure, the acoustic transducer configured to transmit an acoustic signal and receive a return acoustic signal having a plurality of resonances due to the multi-tubular structure;
   an acoustic impedance matching material disposed on a sensing face of the acoustic transducer;
   a signal generator that generates a signal having a plurality of frequencies to drive the acoustic transducer;
   a signal shaper that modifies the signal by applying at least one of amplitude modulation and frequency modulation to provide a drive signal to the acoustic transducer; and
   a processor configured to (i) determine an annulus distance of any tubular in the nested multi-tubular structure with respect to an adjacent tubular using a time of flight of the transmitted acoustic signal, (ii) determine an acoustic speed in a component in the nested multi-tubular structure using the annulus distance and the plurality of resonances, and (iii) determine a characteristic of the component that corresponds with the acoustic speed.

2. The apparatus according to claim 1, further comprising an extendable arm coupled to the mandrel and the acoustic transducer, wherein the acoustic sensor is extendable from the mandrel to be in contact with or close proximity to the inner-most tubular.

3. The apparatus according to claim 1, wherein the mandrel is configured to rotate to provide azimuthal scanning.

4. The apparatus according to claim 1, further comprising a carrier coupled to the mandrel, the carrier comprising a wireline or a drill tubular.

5. The apparatus according to claim 1, wherein the signal is a signal pulse.

6. The apparatus according to claim 1, wherein the acoustic transducer comprises a plurality of distributed acoustic transducers spaced apart from each other to form an acoustic transducer array.

7. The apparatus according to claim 6, wherein the distributed acoustic sensors are distributed azimuthally and/or axially with respect to the inner-most tubular.

8. The apparatus according to claim 7, wherein the processor is further configured to (iv) determine an attenuation in amplitude or energy between return acoustic signals received by at least two acoustic transducers in the acoustic transducer array and (v) correlate the attenuation to a condition of a material in an annulus surrounding the inner-most tubular.

9. The apparatus according to claim 8, wherein at least one acoustic transducer in the acoustic transducer array is configured to: transmit a first acoustic signal to determine the annulus distance; transmit a second acoustic signal to determine the acoustic speed; and transmit a third acoustic signal to determine the attenuation; wherein the first, second, and third acoustic signals are transmitted in any order.

10. The apparatus according to claim 6, wherein the drive signal is provided at least one of concurrently, coherently, or sequentially to the acoustic transducer array.

11. The apparatus according to claim 1, wherein the processor is further configured to:
   detect return signals at a plurality of times;
   process the return signals using a frequency transform to identify frequency peaks present in the return signal; and
   correlate the identified peaks to a characteristic of the nested multi-tubular structure.

12. The apparatus according to claim 1, wherein the acoustic transducer comprises an electric acoustic transducer and/or an electromagnetic acoustic transducer.

13. The apparatus according to claim 1, wherein the acoustic transitional impedance matching material (ATIMM) comprises (a) a first acoustic impedance at the sensing face within a selected range of an acoustic impedance of the sensing face and (b) a second acoustic impedance within a selected range of an acoustic impedance of the inner-most tubular.

14. The apparatus according to claim 13, wherein the ATIMM comprises a transitional acoustic impedance section disposed between two ends of the ATIMM, the transitional acoustic impedance section comprising a third acoustic impedance between the first acoustic impedance and the second acoustic impedance.

15. The apparatus according to claim 13, wherein the ATIMM comprises a multilayer material having a machinable glass ceramic and titanium.

16. The apparatus according to claim 13, wherein the ATIMM comprises a multilayer structure defining an internal cell structure.

17. A method for inspecting a well having a nested multi-tubular structure, the method comprising:
   generating a signal pulse having a plurality of frequencies using a signal generator;
   modifying the signal pulse by applying at least one of amplitude modulation and frequency modulation using a signal shaper to provide a drive signal;
   transmitting an acoustic signal based on the drive signal into an inner-most tubular of the nested multi-tubular structure using an acoustic transducer coupled to a mandrel configured to be conveyed in the inner-most tubular, the acoustic transducer being configured to transmit the acoustic signal and receive a return acoustic signal having a plurality of resonances due to the nested multi-tubular structure;
   transitioning an acoustic impedance between the acoustic transducer and the inner-most tubular using an acoustic transition impedance matching material disposed on a sensing face of the acoustic transducer;
receiving the return acoustic signal having the plurality of resonances using the acoustic transducer;
determining an annulus distance of any tubular in the nested multi-tubular structure with respect to an adjacent tubular using a time of flight of the transmitted acoustic signal;
determining an acoustic speed in a component in the nested multi-tubular structure using the annulus distance and the plurality of resonances; and
determining a characteristic of the component that corresponds with the acoustic speed.

18. The method according to claim 17, further comprising extending the acoustic transducer from the mandrel to be in contact with or close proximity to the inner-most tubular.

19. The method according to claim 17, wherein the acoustic transducer comprises a plurality of distributed acoustic transducers to form an acoustic transducer array having at least two acoustic transducers spaced apart and the method further comprises determining an attenuation in amplitude or energy between return acoustic signals received by the at least two acoustic transducers and correlate the attenuation to a condition of material in an annulus surrounding the inner-most tubular.

20. The method according to claim 17, wherein transmitting comprises transmitting a first acoustic signal to determine the annulus distance, transmitting a second acoustic signal to determine the acoustic speed; and transmitting a third acoustic signal to determine the attenuation; wherein the first, second, and third acoustic signals are transmitted in any order.

21. The method according to claim 17, further comprising:
detecting return signals at a plurality of times;
processing the return signals using a frequency transform to identify frequency peaks present in the return signal; and
correlating the identified peaks to a characteristic of the nested multi-tubular structure.

22. The method according to claim 17, further comprising dynamic focusing of the transmitted acoustic signal using at least one of time multiplexed pulse sequence or phase sequence.

23. The method according to claim 17, further comprising at least one of repairing or remediating a defect of the component as identified by the determined characteristic of the component.

* * * * *